(12) United States Patent
Jensen et al.

(10) Patent No.: US 12,418,754 B2
(45) Date of Patent: Sep. 16, 2025

(54) HEARING AID SYSTEM COMPRISING A SOUND SOURCE LOCALIZATION ESTIMATOR

(71) Applicant: Oticon A/S, Smoerum (DK)

(72) Inventors: Jesper Jensen, Smoerum (DK); Poul Hoang, Smoerum (DK); Simone Birk Bols Thomsen, Aalborg (DK)

(73) Assignee: Oticon A/S, Smørum (DK)

( * ) Notice: Subject to any disclaimer, the term of this patent is extended or adjusted under 35 U.S.C. 154(b) by 273 days.

(21) Appl. No.: 18/308,690

(22) Filed: Apr. 28, 2023

(65) Prior Publication Data

US 2023/0388721 A1    Nov. 30, 2023

(30) Foreign Application Priority Data

May 31, 2022   (EP) .................................. 22176296

(51) Int. Cl.
*H04R 25/00* (2006.01)
*G06F 3/01* (2006.01)
*G06F 16/68* (2019.01)

(52) U.S. Cl.
CPC .......... *H04R 25/407* (2013.01); *G06F 3/013* (2013.01); *G06F 16/686* (2019.01); *H04R 25/405* (2013.01); *H04R 25/505* (2013.01); *H04R 25/604* (2013.01); *H04R 25/609* (2019.05)

(58) Field of Classification Search
CPC .. H04R 25/407; H04R 25/609; H04R 25/405; H04R 25/505
See application file for complete search history.

(56) References Cited

U.S. PATENT DOCUMENTS

2019/0174237 A1*  6/2019  Lunner ................ H04R 1/1041

FOREIGN PATENT DOCUMENTS

| EP | 3185590 | 6/2017 |
| EP | 3253075 | 12/2017 |
| EP | 3267697 | 1/2018 |
| EP | 3413589 | 12/2018 |
| EP | 3496417 | 6/2019 |

OTHER PUBLICATIONS

P. Hoang, Z.-H. Tan, J. M. de Haan, T. Lunner, and J. Jensen "Robust Bayesian and Maximum a Posteriori Beamforming for Hearing Assistive Devices", in 2019 IEEE Global Conference on Signal and Information Processing (GlobalSIP), Ottawa, ON, Canada, Nov. 2019, pp. 1-5.

(Continued)

*Primary Examiner* — Suhan Ni

(57) ABSTRACT

A hearing aid configured to be worn at or in an ear of a user including hearing aid comprising A) a multitude of microphones, B) a database including b1) a plurality of acoustic transfer function vectors representing different candidate locations of a target sound source in the environment relative to the microphone system, and b2) a multitude of posterior probabilities related to at least some of the acoustic transfer function vectors, each posterior probability representing the probability of a given acoustic transfer function given a particular eye-gaze direction of the user, and C) a processor configured to determine a current location of the target sound source relative to the user.

20 Claims, 8 Drawing Sheets

(56) References Cited

OTHER PUBLICATIONS

J. Jensen and U. Kjems, "Maximum Likelihood Based Noise Covariance Matrix Estimation for Multi-Microphone Speech Enhancement," EUSIPCO, Aug. 2012.
J. Jensen and M. S. Pedersen, "Analysis of beamformer directed single-channel noise reduction system for hearing aid applications," in 2015 IEEE International Conference on Acoustics, Speech and Signal Processing (ICASSP), South Brisbane, Queensland, Australia, Apr. 2015, pp. 5728-5732.
K. L. Bell, Y. Ephraim, and H. L. Van Trees, "A Bayesian approach to robust adaptive beamforming," IEEE Transactions on Signal Processing, vol. 48, No. 2, pp. 386-398, Feb. 2000.
E. Habets, J. Benesty, I. Cohen, S. Gannot, and J. Dmochowski, "New Insights Into the MVDR Beamformer in Room Acoustics," IEEE Transactions on Audio, Speech, and Language Processing, vol. 18, No. 1, pp. 158-170, Jan. 2010, doi: 10.1109/TASL.2009.2024731.

\* cited by examiner

HEARING AID SYSTEM COMPRISING A SOUND SOURCE LOCALIZATION ESTIMATOR

TECHNICAL FIELD

The present disclosure relates to hearing devices, e.g. hearing aids, configured to be worn by a user (e.g. fully or partially on the head, e.g. at or in an ear), in particular to sound source localization relative to the user.

Most signal processing algorithms in modern hearing aid (HA) systems benefit from knowledge of the location (e.g. angle and distance) of the sound sources present at a particular moment in time. For example, knowledge of the position of the target sound source (relative to the hearing aid users' nose) may increase noise reduction performance significantly. Similarly, knowledge of the acoustic transfer function (ATF) from a target source to each microphone of the hearing aid system may be useful. The acoustic transfer function is linked to the location of the target source—in most cases, if the location changes, so does the transfer function (or impulse response in the time domain). As before, algorithms on-board a HA system may benefit significantly from access to information about such transfer function(s).

Traditionally, the target location or the ATF is estimated based on the microphone signals of the HA system, i.e., acoustic information. However, in future HA systems, one might have access to additional signals. For example, future HA systems may be configured to measure an eye-gaze direction of the user, e.g., via cameras pointing towards the eyes of the user (e.g., mounted on glasses), or using electrodes (e.g., in-ear electrodes), which may reveal the direction as a function of time of the users' eye (cf. e.g. [7]). The underlying idea here is that the user's eyes tend to be directed towards the target sound source—at least now and then—in order to lip-read or stay socially connected with the target talker. Hence, the user's eye-gaze direction often contains information about the location of sound sources, and, in particular, the location of the target sound source. Below, we present ideas that make use of this additional source of information.

SUMMARY

In an aspect, the present disclosure relates to a user worn hearing aid comprising A) a multitude of microphones for picking up sound in an environment of the user, B) a database comprising b1) a plurality of acoustic transfer function vectors representing different candidate locations of a target sound source in the environment relative to the microphone system, and b2) a multitude of posterior probabilities related to at least some of the acoustic transfer function vectors, each posterior probability representing the probability of a given acoustic transfer function given a particular eye-gaze direction of the user, and C) a processor configured to determine a current location of the target sound source relative to the user in dependence of 1) current values of time varying electric input signals picked up by the multitude of microphones, 2) a time-varying signal providing information about a current eye-gaze direction of the user, and 3) the database.

A First Hearing Aid:

In an aspect of the present application, there is provided a hearing aid configured to be worn at or in an ear of a user, is provided. The hearing aid comprises

- a microphone system comprising a multitude of M of microphones, where M is larger than or equal to two, the microphone system being adapted for picking up sound from the environment and to provide M corresponding electric input signals $y_m(n)$, m=1, . . . , M, n representing time, the sound from the environment at a given microphone comprising a mixture of
  - a target sound signal $x_m(n)$ propagated via an acoustic propagation channel from a location (a) of a target sound source to the $m^{th}$ microphone of the hearing aid, when worn by the user (n being e.g. a time index), and
  - possible additive or non-additive noise signals $v_m(n)$ as present at the location of the $m^{th}$ microphone,
  - wherein the acoustic propagation channel is modeled as $y_m(n) = x_m(n) \cdot h_m(n) + v_m(n)$, where $h_m(n)$ is the impulse response from the target sound source to the $m^{th}$ microphone;
- a processor connected to said multitude M of microphones and configured to process said electric input signals, or one or more signals originating therefrom; and
- a database ($\Theta$) comprising
  - a plurality of acoustic transfer function vectors ($d(k, \theta_i)$), representing different candidate locations ($\theta_i$) of the target sound source relative to the microphone system, when said microphone system is mounted at or in an ear of a natural or artificial person, wherein the M vector elements ($d_m(k, \theta_i)$) of a given acoustic transfer function vector ($d(k, \theta_i)$) represents frequency dependent acoustic propagation of sound from a location ($\theta_i$) of the target sound source to said M microphones, k being a frequency index, k=1, . . . , K, where K is a number of frequency bands, and i being a location index, i=1, . . . , I, I being the number of different locations, and
  - a multitude of posterior probabilities (p) related to at least some of said acoustic transfer function vectors ($d(k, \theta_i)$) and different eye-gaze directions ($\varphi_j$) of the user, wherein the posterior probability ($p(d(k, \theta_i)|\varphi_j)$) of a specific transfer function vector ($d(k, 00)$) is the probability of said specific transfer function vector ($d(k, \theta_{i*})$) given a particular eye-gaze direction ($\varphi_{j*}$).

The processor may be configured to determine the current location (a) of the target sound source relative to the user in dependence of

- current values of said time varying electric input signals ($y_m(n)$),
- a time-varying signal ($\varphi(n)$), which provides information about a current eye-gaze direction of the user,
- said acoustic transfer function vectors ($d(k, \theta_i)$), and said posterior probabilities ($p(d(k, \theta_i)|\varphi_j)$) of said database ($\Theta$).

Thereby an improved hearing aid may be provided.

The processor is configured to determine the probability of a particular acoustic transfer function vector ($d(k, \theta_i)$), given the (observations of the) current electric input signals ($y_m(n)$) provided by the multitude if microphones and the current information ($\phi(n)$) about the user's eyes, e.g. an eye-gaze signal. The current information ($\phi(n)$) about the user's eyes may e.g. comprise a signal $\varphi(n)$, which provides user-related information about the acoustic scene. The signal $\varphi(n)$ may for example be an EEG-signal reflecting a direction of auditory attention.

The vector elements ($d_m(k, \theta_i)$) of the acoustic transfer function vectors ($d(k, \theta_i)$) may comprise relative acoustic transfer functions determined relative to an acoustic transfer function ($d'_{m*}(k,\theta_i)$) of a reference microphone (m*) among the M microphones of the microphone system from a given sound source to the reference microphone (m*).

A current eye gaze direction may e.g. be provided relative to a direction to the user's nose. The current eye gaze direction may e.g. be provided relative to the hearing aid, e.g. to the microphone system of the hearing aid. The current eye gaze direction may e.g. be provided as an eye gaze angle relative to a known direction of the user and/or of the hearing aid, when worn by the user. The information about a current eye-gaze direction of the user may e.g. be represented by the eye-gaze-angle (e.g. in a horizontal plane).

The vector elements of the acoustic transfer function vectors may be constituted by or comprise relative acoustic transfer functions. The acoustic transfer functions (ATF) may comprise relative acoustic transfer functions (RATF). To determine the relative acoustic transfer functions, e.g. RATF-vectors do, of the database ($\Theta$) from the corresponding absolute acoustic transfer functions (AATF), $H_\theta$, the element of RATF-vector ($d_\theta$) for the $m^{th}$ microphone and direction ($\theta$) is $d_m(k,\theta) = H_m(\theta,k)/H_i(\theta,k)$, where $H_i(\theta,k)$ is the (absolute) acoustic transfer function from the given location ($\theta$) to a reference microphone (m=i) among the M microphones of the microphone system. Such absolute and relative transfer functions (for a given artificial or natural person) can be estimated (e.g. measured in advance of the use of the hearing aid system) and stored in the database $\Theta$. The resulting (absolute) acoustic transfer function (AATF) vector $H_\theta$ for sound from a given location ($\theta$) is denoted as $$H(\theta,k) = [H_1(\theta,k) \ldots H_M(\theta,k)]^T, k=1, \ldots, K$$

and the relative acoustic transfer function (RATF) vector do from this location is denoted as $$d(\theta,k) = [d_1(\theta,k) \ldots d_M(\theta,k)]^T, k=1, \ldots, K.$$

The acoustic transfer function vectors stored in the database ($\Theta$) may be time-invariant. The vector elements of the acoustic transfer function vectors stored in the database ($\Theta$) may e.g. be estimated (e.g. measured) based on a model of the human head. Preferably the acoustic transfer functions are determined using a hearing aid (or directional system) that matches (e.g. is identical to) the hearing aid configured to be worn on the head at or in an ear of the user. The vector elements may alternatively or additionally be estimated (e.g. measured) when the hearing aid is mounted on a human head, e.g. the head of the user (or a head of another person or on heads of several persons having different head characteristics (e.g. sizes or forms)).

The database ($\Theta$) may alternatively or additionally be updated with acoustic transfer functions estimated during use of the hearing aid, and or corresponding eye-gaze information.

The current gaze direction may be quantized into a limited number of directions. The number of directions may e.g. be larger than one, e.g. larger than two, e.g. in the range between three and nine. The number of directions may e.g. be odd.

The information about a current eye-gaze direction of the user may be provided by one or more sensors. The one or more sensors may be located in the hearing aid and/or be accessible to the hearing aid (e.g. located in another device in communication with the hearing aid). The one or more sensors may for example comprise a camera (or more than one camera) pointing towards the user's eyes, e.g. mounted on glasses. The one or more sensors may for example comprise head-mounted electrodes, providing EEG or EOG signals or other body generated signals.

The hearing aid may comprise a filter bank allowing the processor to process the electric input signals, or one or more signals originating therefrom, in a time-frequency representation (k,l), where k is a frequency index, and l is a time index.

The current different eye-gaze directions ($\varphi_j$) may be included in the database ($\Theta$) as dictionaries ($\Phi_j$) of posterior probabilities for different eye gaze directions ($\varphi_j$) for at least some of the plurality of acoustic transfer function vectors ($d(k,\theta_i)$).

Values of posterior probabilities ($p(d(k,\theta_i)|\varphi_j)$) for i=1, ..., I and j=1, ..., J may be computed in advance of use of the hearing aid and stored in the database ($\Theta$).

The processor may be configured to determine the posterior probabilities in dependence of a likelihood of the current electric input signals (y(n)) for given acoustic transfer function vectors ($d(k,\theta_i)$). The current electric input signals (y(n)) are the values of the electric input signals $y_m(n)$, m=1, ..., M, at the respective microphones of the hearing aid. Hence $y(n) = [y_1(n), \ldots, y_M(n)]$. The current electric input signals (y(n)) are e.g. provided in the time-frequency domain, as $Y(k,l) = [Y_1(k,l), \ldots, Y_M(k,l)]$.

The processor may be configured to determine the current acoustic transfer function vector ($d(k,\theta^*)$) based on a statistical model linking current observations of the electric input signals (Y(k,l)) and time-varying signal ($\varphi(n)$) to the current acoustic transfer function vector ($d(k,\theta^*)$) as the acoustic transfer function vector ($d(k,\theta^*)$) exhibiting the maximum of conditional probability given the current electric input signals (Y(k,l)) and the current time-varying signal ($\varphi(n)$). The statistical model may consider the current electric input signals Y(k,l), the time varying signal ($\varphi(n)$) representing current eye-gaze of the user, and the relative transfer functions ($d(k,l,\theta_i)$) as realizations of random variables and describe their interdependency using the conditional probability density function $p(d(k,l,\theta_i)|Y(k,l),\phi_j(n))$.

The processor may be configured to determine the current target signal (X*(k,l)) in dependence of the conditional probability density function ($p(d(k,l,\theta_i)|Y(k,l),\phi_j(n))$) for the acoustic transfer function vector ($d(k,\theta_i)$) given the current electric input signals(Y(k,l)) and the current time variant signal (($\varphi_j(n)$)) associated with a current eye-gaze of the user. Thereby, beamforming is facilitated in that beamformer filter coefficients can be determined.

The processor may be configured to determine weights of a beamformer filter in dependence of the current acoustic transfer function vector ($d(k,\theta^*)$).

The processor may be configured to estimate a physical location ($\theta^*$) for a given frequency k of the target sound source by identifying the most likely index (i*) of the chosen acoustic transfer function ($d^*(k,\theta_i)$). The given frequency may advantageously be a relatively low audio frequency, e.g. a frequency where speech is present with a high probability, e.g. a frequency below 2 kHz (and e.g. above 250 Hz). This has the advantage of having a relatively low processing complexity.

The processor may be configured to estimate a physical location ($\theta^*$) of a target by finding the index (i*), which maximizes $$i^* = \arg\min_i Z(p(d(k=1, l, \theta_i) | Y(k=1, l),$$
$$\phi_j(n)), \ldots, \cdot p(d(k=K, l, \theta_i) | Y(k=K, l), \phi_j(n))),$$

where Z(·) is a function which combines the probabilities across frequency, e.g. a product of all per-frequency-probabilities.

The conditional probability density function ($p(d(k,l,\theta_i)|Y(k,l),\phi_j(n))$) providing the probability of the currently used relative transfer function ($d(k,\theta_i)$) being the currently used relative transfer function ($d(k,l,\theta_i)$), given the current electric input signals ($Y(k,l)$), and the time varying signal ($\phi(n)$) representing current eye-gaze of the user, may be integrated over a plurality (L) of time units.

Integration over time may e.g. be appropriate in a situation where two or more speakers are active in a discussion to thereby allow for 1) switching a beamformer between the two or more speakers or 2) to allow for generating two or more 'fixed' beamformers directed towards the two or more speakers. In the first case, the plurality of time units may correspond to L being of the order of milli-seconds (ms), e.g. in a range between 10 and 50 ms, e.g. 20 ms. In the second case, the plurality of time units may correspond to L being of the order of seconds (s), e.g. in a range between 5 s and 10 s.

Integration over time of the conditional probability $p(d(k,l,\theta_i)|Y(k,l),\phi_j(n))$ may e.g. be expressed as $$\tilde{P}(l) = \frac{1}{L} \sum_{l'=l-L+1}^{l} p(d(k,l',\theta_i)|Y(k,l'),\phi_j(l'))$$

where l represents the current time and L represents the averaging time, cf. e.g. FIG. 6.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The processor (e.g. a/the signal processor) may be configured to enhance the electric input signals and to provide a processed electric output signal in dependence thereof.

The hearing aid may comprise an output unit for providing a stimulus perceived by the user as an acoustic signal based on a processed electric signal (e.g. the processed electric input signal(s)). The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at to by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

A Second Hearing Aid:

In a further aspect, a second hearing aid is further provided. The hearing aid comprises a microphone system comprising a multitude of M of microphones, where M is larger than or equal to two, the microphone system being adapted for picking up sound from the environment and to provide M corresponding electric input signals $y_m(n)$, m=1, . . . , M, n representing time, the sound from the environment at a given microphone comprising a a target sound signal $x_m(n)$ propagated from a location ($\theta_i$) of a target sound source to the $m^{th}$ microphone of the hearing aid, when worn by the user, a processor connected to said multitude M of microphones and configured to process said electric input signals, or one or more signals originating therefrom;

a database $\Theta$ comprising a plurality of acoustic transfer function vectors ($d(k, \theta_i)$), representing different locations (a) of the target sound source relative to the microphone system, when said microphone system is mounted on a head at or in an ear of a natural or artificial person, a multitude of conditional probabilities (p) related to at least some of said acoustic transfer function vectors ($d(k,\theta_i)$) and parameters ($\varphi_j$) related to the eyes of the user, wherein the posterior probability ($p(d(k,\theta_i)|\phi_j)$) of a specific transfer function vector ($d(k,\theta_{i*})$ is the probability of said specific transfer function vector ($d(k,\theta_{i*})$) given a particular parameter ($\varphi_{j*}$) related to the eyes of the user;

wherein said processor is configured to determine the location ($\theta_i$) of the target sound source in dependence of a) said electric input signals ($y_m(n)$), b) said acoustic transfer function vectors ($d(k,\theta_i)$), and c) a time-varying signal $\phi(n)$, which provides information about a current value of said parameter related to the eyes of the user.

The conditional (or posterior) probability describes the probability that a given acoustic transfer function vector ($d(k,\theta_i)$) "were used" to generate the observed acoustic signal (i.e. the current electric input signals ($y_m(n)$)), given the observed current information ($\phi)(n)$) about the parameter related to the eyes of the user (this information e.g. comprising the eye-gaze direction of the user, a pupil size of the user, etc.). Thereby, the probability that the target sound source is in a particular location (a) can be estimated.

The features of the first hearing aid are intended to be combinable with the second hearing aid.

A Third Hearing Aid:

In a further aspect, a third hearing aid is further provided. The hearing aid comprises a microphone system comprising a multitude of M of microphones, where M is larger than or equal to two, the microphone system being adapted for picking up sound from the environment and to provide M corresponding electric input signals $y_m(n)$, m=1, . . . , M, n representing time, the sound from the environment at a given microphone comprising a a target sound signal $x_m(n)$ propagated from a location (a) of a target sound source to the $m^{th}$ microphone of the hearing aid, when worn by the user, a processor connected to said multitude M of microphones and configured to process said electric input signals, or one or more signals originating therefrom;

a database $\Theta$ comprising a plurality of acoustic transfer function vectors ($d(k, \theta_i)$), representing different locations (a) of the target sound source relative to the microphone system, when said microphone system is mounted on a head at or in an ear of a natural or artificial person, a multitude of conditional probabilities (p) related to at least some of said acoustic transfer function vectors ($d(k,\theta_i)$) and different eye-gaze directions ($\varphi_j$) of the user, wherein the posterior probability ($p(d(k,\theta_i)|\varphi_j)$) of a specific transfer function vector ($d(k,\theta_i)$ is the probability of said specific transfer function vector ($d(k,\theta_i)$) given a particular eye-gaze direction ($\varphi_{j*}$);

wherein the processor is configured to determine the conditional probability of a particular acoustic transfer function vector ($d(k,\theta_i)$), given the observations of the current electric input signals ($y_m(n)$) and a current value ($\varphi(n)$) of the eye-gaze direction of the user.

The features of the first hearing aid are intended to be combinable with the third hearing aid.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid configured to be worn at or in an ear of a user, the hearing aid comprising a microphone system comprising a multitude of M of microphones, where M is larger than or equal to two, the microphone system being adapted for picking up sound from the environment, is furthermore provided. The method comprises providing by said multitude of microphones M corresponding electric input signals $y_m(n)$, m=1, ..., M, n representing time, the sound from the environment at a given microphone comprising a mixture of
  a target sound signal $x_m(n)$ propagated via an acoustic propagation channel from a location (a) of a target sound source to the $m^{th}$ microphone of the hearing aid, when worn by the user (n being e.g. a time index), and
  possible additive or non-additive noise signals $v_m(n)$ as present at the location of the $m^{th}$ microphone,
  wherein the acoustic propagation channel is modeled as $y_m(n)=x_m(n)\cdot h_m(n)+v_m(n)$, where $h_m(n)$ is the impulse response from the target sound source to the $m^{th}$ microphone;

processing said electric input signals, or one or more signals originating therefrom; and providing a database ($\Theta$) comprising
  a plurality of acoustic transfer function vectors ($d(k, \theta_i)$), representing different locations ($\theta_i$) of the target sound source relative to the microphone system, when said microphone system is mounted at or in an ear of a natural or artificial person, wherein the M vector elements ($d_m(k,\theta_i)$) of a given acoustic transfer function vector ($d(k,\theta_i)$) represents frequency dependent acoustic propagation of sound from a location (Or) of the target sound source to said M microphones, k being a frequency index, k=1, ..., K, where K is a number of frequency bands, and i being a location index, i=1, ..., I, I being the number of different locations, and
  a multitude of posterior probabilities (p) related to at least some of said acoustic transfer function vectors ($d(k,\theta_i)$) and different eye-gaze directions ($\varphi_j$) of the user, wherein the posterior probability ($p(d(k,\theta_i)|\varphi_j)$) of a specific transfer function vector ($d(k,\theta_i)$) is the probability of said specific transfer function vector ($d(k,\theta_i)$) given a particular eye-gaze direction (co j.).

The processing comprises determining the location ($\theta_i$) of the target sound source in dependence of
  current values of said time varying electric input signals ($y_m(n)$),
  a time-varying signal ($\varphi(n)$), which provides information about a current eye-gaze direction of the user,
  said acoustic transfer function vectors ($d(k,\theta_i)$), and
  said posterior probabilities ($p(d(k,\theta_i)|\varphi_j)$) of said database ($\Theta$).

In a further aspect, a further method of operating a hearing aid configured to be worn by a user is provided by the present disclosure. The method comprises providing a multitude current values of time varying electric input signals representing sound in an environment of the user;

providing a database comprising
  a plurality of acoustic transfer function vectors representing different candidate locations of a target sound source in the environment relative to the microphone system; and
  a multitude of posterior probabilities related to at least some of the acoustic transfer function vectors, each posterior probability representing the probability of a given acoustic transfer function given a particular eye-gaze direction of the user; and determining a current location of the target sound source relative to the user in dependence of
  current values of time varying electric input signals picked up by the multitude of microphones,
  a time-varying signal providing information about a current eye-gaze direction of the user, and
  said database.

It is intended that some or all of the structural features of the devices described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method or methods described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method or methods described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method or methods described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in applications such as hearing aids or headsets or earphones or ear protection device, or combinations thereof.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
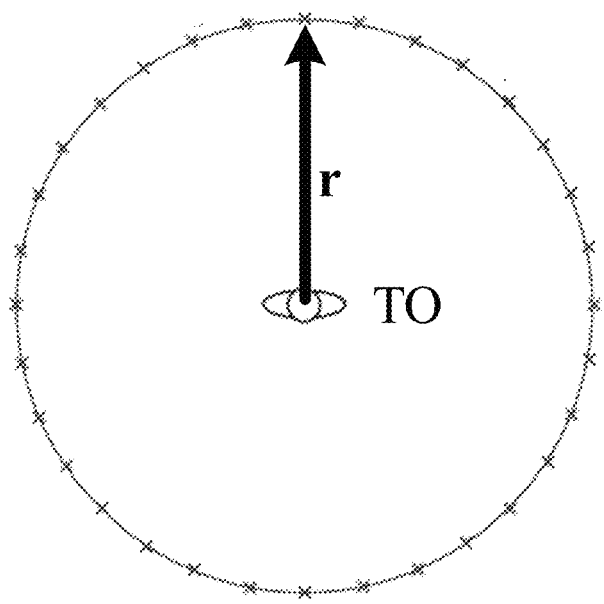
FIG. 1A shows a first example of potential target sound source locations ($\theta_i$, i=1, ..., I) on a circle for estimating absolute and/or relative acoustic transfer functions ($ATF_m(\theta_j,k)$) for a given microphone of a hearing aid worn by a test person according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to hearing devices, e.g. hearing aids, configured to be worn by a user, in particular to sound source localization relative to the user.

In the following, it is described how to use microphone signals and an auxiliary signal—in this case a signal related to the eyes of the hearing aid user—to extract information related to the position of the target sound source (or, equivalently, information about the acoustic transfer function from the target sound source to the microphones of the hearing aid system).

Estimation of Relative Acoustic Transfer Function Vectors Based on Microphone and Eye-Gaze Data—Background:
Acoustic Information—Microphone Signals:

In the following outline, the standard assumption that the sound signal $y_m(n)$ impinging on the m'th microphone is given by the sum of a target signal $x_m(n)$ and a noise component $v_m(n)$, is made, i.e., $$y_m(n) = x_m(n) + v_m(n), m = 1, \ldots, M.$$

Each microphone signal is passed through an analysis filter bank, e.g., a short-time Fourier Transform (STFT), leading to a time-frequency domain signal of the form $Y_m(k,l) = X_m(k,l) + V_m(k,l)$, $m = 1, \ldots, M$, where k is a frequency index and l is a time (frame) index. For a given frequency index k and time index l, the spectral coefficients (e.g. STFT coefficients) are collected in a vector, $$Y(k,l) = [Y_1(k,l) \ldots Y_M(k,l)]^T$$

and similarly for vectors X(k,l) and V(k,l), so that in vector notation $$Y(k,l) = X(k,l) + V(k,l).$$

For a given frequency index k and time index l, let $$d'(k,l,\theta_i) = [d_1'(k,l,\theta_i) \ldots d_M'(k,l,\theta_i)]^T, i = 1, \ldots, I$$

denote the (generally complex-valued) acoustic transfer function vector from candidate target sound source location i to each microphone of the hearing aid system. We assume that the target signal can originate from one out of I pre-selected source locations. Each such source location is represented by a (generally) different acoustic transfer function vector $d'(k,l,\theta_i)$.

It is often more convenient to operate with a normalized version of $d'(k,l,\theta_i)$. More specifically, let $$d(k,l,\theta_i) = d'(k,l,\theta_i)/d_{m^*}'(k,l,\theta_i)$$

denote a vector whose elements $d_m(k,l,\theta_i)$, $m = 1, \ldots, M$ represent the relative acoustic transfer function (RATF) from the target source to the m'th microphone, and where the microphone with index m* is a pre-selected reference microphone. This implies that the m*'th element in vector $d(k,l,\theta_i)$ equals one, and the remaining elements describe the acoustic transfer function from the other microphones to this reference microphone.

In a typical state of the art hearing device, the number I of source locations is I=2 (e.g. front/back of a monaural hearing aid or left/right of a binaural hearing aid system). Other configurations with larger number of sound sources may, however, be envisioned, e.g. I=4 (e.g., front, back, left, right or front-left, front-right, back-left, back-right), or I=8–64, would probably be reasonable from complexity point-of-view. However, 64<I<1024 or even higher might be possible in the future (or if computations are exported to outside the ear).

Typically, the number of input transducers M of a hearing aid or headset is larger than or equal to two (M≥2). Normally M=2, or 3, or M=4-6 (incl. microphones in a binaural configuration) would be reasonable.

FIG. 1A shows a first example of potential target sound source locations ($\theta_i$, i=1, ..., I) on a circle (radius r) for estimating absolute and/or relative acoustic transfer functions ($ATF_m(\theta_i,k)$) for a given microphone of a hearing aid when worn by a test person according to the present disclosure. We associate the possible set of source locations ($\theta_i$) with elements of a database—or dictionary—of RATFs, $\Theta = \{d(k,l,\theta_1), \ldots, d(k,l,\theta_I)\}$, k=1, ..., K, where each RATF vector $d(k,l,\theta_i)$ is associated with one particular target candidate location ($\theta_i$). FIG. 1A depicts a graphical example of such dictionary/database, where candidate target locations are confined to a circle around the user, and where each cross on the circle represents an RATF vector in the dictionary ($\Theta$). In the example of FIG. 1A, the number of sound source locations is I=24. The locations are evenly distributed locations at a distance r (=|r|) from the centre of the head of the test object (TO). The vector r may represent a look direction of the test object, corresponding to the location (or angle) $\theta_i$, =0° in a horizontal plane. Each location corresponds to an angle $\theta_i = i \cdot 360°/I$, i=1, ..., I, in the horizontal plane. In the example of FIG. 1A, the 'angular step' is 360°/24=15°.

Obviously, FIG. 1A is an example—other dictionaries can be envisioned where candidate target locations are in other positions, e.g., a sphere around the test object/user, several spheres, or in any other setup (essentially, a dictionary/database is just a collection of vectors—they don't need to be arranged in a particular physical pattern). Another example is shown in FIG. 1B.

Figure 1B:
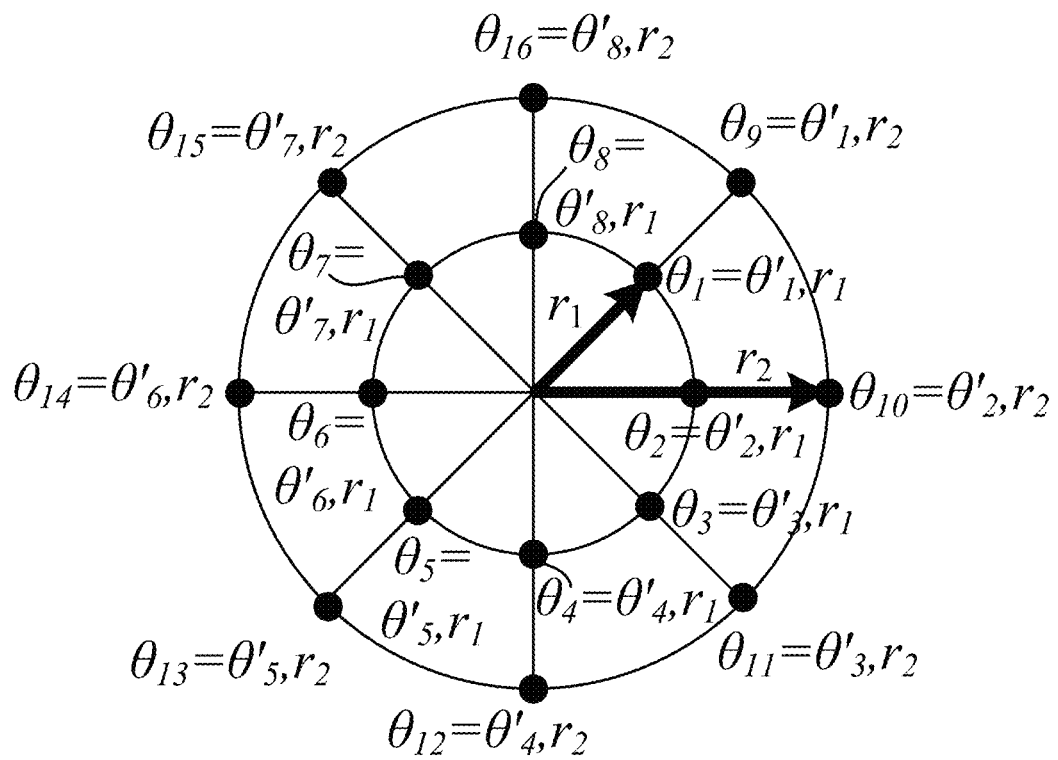
FIG. 1B shows a second example of potential target sound source locations ($\theta_i$, i=1, ..., I) on two concentric circles with different radii ($r_1$, $r_2$) for estimating absolute and/or relative acoustic transfer functions ($ATF_m(\theta_j,k)$) for a given microphone of a hearing aid worn by a test person according to the present disclosure.

FIG. 1B schematically illustrates a second example of potential target sound source locations ($\theta_i$, i=1, ..., I) on two concentric circles with different radii ($r_1$, $r_2$) for estimating absolute and/or relative acoustic transfer functions ($ATF_m(\theta_j,k)$) for a given microphone of a hearing aid when worn by a test person according to the present disclosure. The position one the two circles of the I=16 location of sound sources er denoted $\theta_i$, i=1, ..., I=16. The locations of the inner (having radius $r_1$) and outer circles (having radius $r_2$) are characterized by their polar coordinates ($\theta'_z$, $r_q$), where z=1, ... Z=8, and q=1, ..., R=2. The values of number of angles Z and number of radii R may be adapted according to the application in question. Likewise, the sound source locations may be positioned on other geometrical patterns than circles and may be non-uniformly distributed. Further, the sound source locations may be distributed in three dimensions, each location being e.g. defined in a spherical (or orthogonal) coordinate system, e.g. centered at the center of the head of the test object/user.

With an RATF dictionary in mind, the noisy microphone signals observed at the microphones may be written as $$Y(k,l)=\overline{X}(k,l)d(k,l,\theta_i)+V(k,l),$$

where $\overline{X}(k,l)$ is the spectral coefficient of the target signal at the reference microphone, and where $d(k,l,\theta_i)$ is one particular RATF vector from the dictionary $\Theta$, representing the physical location where the target sound source happens to be.

Auxiliary Information—Example: Eye-Gaze Direction:

In addition to access to the microphone signals stored in the vector Y(k,l), we assume that the HA system has access to a time-varying signal $\phi(n)$, which provides additional auxiliary information. Specifically, we assume that 4)(n) provides information about the user's eyes (e.g. their direction); here n is a time variable which may be synchronized with (i.e., identical to) the time variable/related to the acoustic information, i.e., Y(k,l). The information represented by $\phi(n)$ could—for example—be the eye-angle in the horizontal plane, in which case $\phi(n)$ is a scalar (i.e., a single number) or the eye-angles in both the horizontal and the vertical plane, in which case $\phi(n)$ is a vector. In principle, the eye-related signal $\phi(n)$ could also contain other information, e.g., pupil-size, pupil dilation, time-derivative of pupil-size, any information that may be derived from a video-sequence of the users' eye, etc.

Figure 2:
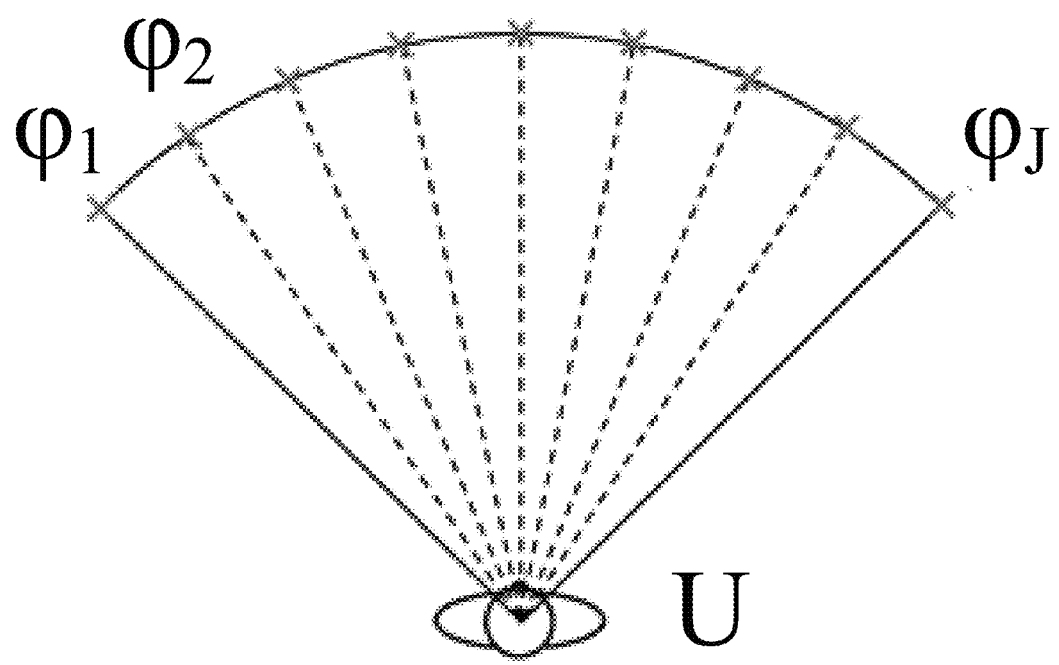
FIG. 2 shows an example of a users' candidate eye-gaze directions $\varphi_j(n)$, j=1, ..., J=9, at time n, FIG. 3 schematically illustrates a setup, for a given test person, for providing a combination of estimates of absolute and/or relative acoustic transfer functions ($ATF_m(\theta_j,k)$) for a given microphone of a hearing aid (HD, or a pair of hearing aids ($HD_R$, $HD_L$)) for different locations ($\theta_i$, i=1, ..., I) as a function of a frequency index (k, k=1, ..., K), and conditional probabilities p for each acoustic transfer function ($ATF_m(\theta_j,k)$) given different eye-gaze angles of the user ($\varphi_j$, j=1, J), FIG. 4 schematically shows an exemplary block diagram of a hearing aid according to the present disclosure, FIG. 5 schematically shows an exemplary block diagram of a hearing aid comprising a beamformer filtering unit according to the present disclosure, FIG. 6 schematically shows the 'history' used in the integration over time of the conditional probabilities $p(d(k,l,\theta_i|Y(k,l),\phi_j(n))$ of a given acoustic transfer function $d(k,l,\theta_i)$ being the optimal one at a given time l, given current microphone signals Y(k,l) and eye gaze angles $\varphi(n)$ for time instants l' included in the history defined by the parameter L, and FIG. 7 shows an exemplary eye-gaze estimator for implementation in a hearing aid according to the present disclosure, FIG. 8A schematically illustrates how the posterior probability may look like for a single observation of the eye-gaze signal (target located to the right side of the user)

FIG. 2 shows an example of a users' candidate eye-gaze directions $\varphi_j(n)$, j=1, ..., J=9, at time n. FIG. 2 schematically illustrates a number of predefined eye-gaze angles reflecting the (limited) angle range available for a human being (e.g. a user (U) of the hearing aid). The angle range may e.g. be smaller than or equal to 160°, e g smaller than or equal to 120°, such as smaller than or equal to 90°, such as smaller than or equal to 60°. In the first case, the angular step of the example of FIG. 2 is 120°/8=15°.

In the following it is assumed that, for ease of explanation and without loss of generality, that $\phi(n)$ represents the users' eye angle in the horizontal plane with respect to the frontal direction, as a function of time. For simplicity, it is assumed that the eye-gaze angle at a particular moment in time is one out of J possible angles, $\phi(n)=\{\phi_1(n), ..., \phi_J(n)\}$. In other words, a dictionary of candidate eye-gaze angles is defined. An example ($1 \leq j \leq 9$) of a set of candidate eye-gaze directions is depicted in FIG. 2, where each cross indicates a direction in which the eye-gaze may be. In practice, to obtain the eye-gaze signal, one or multiple peripheral sensors, are assumed accessible, for example camera(s) mounted on glasses pointing towards the user's eyes, EEG or EOG signals from head-mounted electrodes, etc.

Computing the Probability of a Relative Acoustic Transfer Function Vector Based on Microphone and Eye-Gaze Data:

Our goal is to compute the probability of a particular RATF vector $d(k,l,\theta_i)$ given the observations from the microphone signals Y(k,l) and eye-gaze signal $\phi(n)$. To do so, we extend the results from [1] which presented dictionary-based solutions to the problem of estimating the RATF vector $d(k,l,\theta_i)$ only from microphone signals Y(k,l). The proposed idea is related to our patent application EP 3 413 589 A1 ([2]). Specifically, we extend these results to be useful in a situation, where an additional auxiliary signal is available, e.g. an eye-gaze signal $\phi(n)$.

To derive estimators of the RATF vector, given access to Y (k,l) and $\phi_j(n)$, we rely on a statistical model linking observations to Y(k,l) and $\phi_j(n)$ to the RATF vector $d(k,l,\theta_i)$. Such statistical model considers Y(k,l), $\phi_j(n)$, and $d(k,l,\theta_i)$ as realizations of random variables and describe their interdependency using the conditional probability density function $p(d(k,l,\theta_i)|Y(k,l),\phi j(n))$.

Hence, being able to compute (estimate) the values of $p(d(k,l,\theta_i)|Y(k,l),\phi_j(n))$ is crucial—in the following we describe in detail how to do that.

To be able to compute $p(d(k,l,\theta_i)|Y(k,l),\phi_j(n))$, we expand it using Bayes theorem such that $$p(d(k,\ l_k\theta_i)\,|\,Y(k,\ l)_j\phi_j(n)) = \qquad \text{Eq. (1)}$$
$$\frac{f(Y(k,\ l)\,|\,d(k,\ l,\ \theta_i),\ \phi_j(n))\cdot p(d(k,\ l,\ \theta_i)\,|\,\phi_j(n))}{f(Y(k,\ l),\ |\,\phi_j(n))} =$$
$$\frac{f(Y(k,\ l)\,|\,d(k,\ l,\ \theta_i))\cdot p(d(k,\ l,\ \theta_i)\,|\,\phi_j(n))}{f(Y(k,\ l)\,|\,\phi_j(n))}.$$

In the following, we describe in quite some detail one way (there are probably others) to evaluate the factors on the right-hand side in order to be able to compute the value of $p(d(k,l,\theta_i)|Y(k,l),\phi_j(n))$ on the left-hand side. Specifically, we can evaluate the factors on the right-hand side as follows:

ƒ(Y(k,l)|d(k,l,$\theta_i$)) is the likelihood of Y(k,l) given d(k,l, $\theta_i$). In order to compute the value of this function, we follow the procedure outlined in [1, 2]

Specifically, to compute ƒ(Y(k,l)|d(k,l,$\theta_i$)), we assume that Y(k,l) is circular symmetric complex Gaussian distributed. Under this assumption, the likelihood function ƒ(Y(k,l)|d(k,l,$\theta_i$)) is given as $$f(Y(k,\ l)\,|\,d(k,\ l,\ \theta_i)) =$$
$$\frac{1}{\pi\cdot\det(C_Y(k,\ l,\ \theta_i))}\cdot\exp\left(-Y^H(k,\ l)C_Y^{-1}(k,\ l,\ \theta_i)Y(k,\ l)\right),$$

where H denotes the Hermitian transpose, det(·) denotes the determinant operator, and $C_Y(k,l,\theta_i)=E[Y(k,l)Y^H(k,l)]$ is the cross power spectral density (CPSD) matrix of the microphone signal Y(k,l).

Next, we assume the following model of $C_Y(k,l,\theta_i)$ [3, 4], $$C_Y(k,l,\theta_i)=\lambda_X(k,l)d(k,l,\theta_i)d^H(k,l,\theta_i)+\lambda_V(k,l)\Gamma_V(k,l_0)$$

where $\lambda_X(k,l)=E[|X(k,l)|^2]$ is the target speech signal power spectral density (PSD) at the reference microphone (E[·] denotes the expectation operator), $\lambda_V(k,l)=E[|V_m\cdot(k,l)|^2]$ is the noise PSD at the reference microphone, and $$\Gamma_V(k, l_0) = \frac{E[V(k, l_0)V^H(k, l_0)]}{\lambda_V(k, l_0)}$$

is the normalized noise CPSD matrix.

Finally, in order to evaluate $C_Y(k,l,\theta_i)$ for a particular candidate RATF vector $d(k,l,\theta_i)$ in practice, we follow the procedure described in [4]. Specifically, $\Gamma_V(k,l_0)$ may be estimated from speech absence time-frequency tiles, where $l_0$ denotes the latest time instant in the past with speech absence, while to estimate $\lambda_X(k,l)$ and $\lambda_V(k,l)$, ML estimators from [4] may be used.

$p(d(k,l,\theta_i)|\phi_j(n))$ is the posterior (conditional) probability of $d(k,l,\theta_i)$ given $\phi_j(n)$. This quantity describes how knowledge of the auxiliary information—the user's horizontal eye-gaze direction in this particular example—provides about the target location or, more specifically, the target RATF vector $d(k,l,\theta_i)$.

In practice, values of $p(d(k,l,\theta_i)|\phi_j(n))$ for i=1, . . . , I and j=1, . . . ,J may be computed in advance and stored in a look-up table (database). An example of a look-up table is shown in Table 1 below:

TABLE 1

Pre-computed look-up table with posterior probabilities p (d(k, l, $\theta_i$)|$\phi_j$(n)).

|  | $\phi_1$(n) | . . . | $\phi_J$(n) |
|---|---|---|---|
| d(k, l, $\theta_1$) | p(d(k, l, $\theta_1$)|$\phi_1$(n)) | . . . | p(d(k, l, $\theta_1$)|$\phi_J$(n)) |
| . . . | . . . | . . . | . . . |
| d(k, l, $\theta_I$) | p(d(k, l, $\theta_I$)|$\phi_1$(n)) | . . . | p(d(k, l, $\theta_I$)|$\phi_J$(n)) |

The probabilities in this table may be computed in advance from experiments where the user's eye-gaze is measured using the particular HA system in question in various acoustic situations with target sound sources located in various locations. For example, to obtain the value of $p(d(k,l,\theta_i)|\phi_1(n))$ one may count the fraction of situations (e.g. fraction of time), where the target position is in location i=I, when the user's eye gaze is towards $\phi_1(n)$. It is important that these measurements are performed using the particular HA system in question—for example, if the HA system uses eye-gaze horizontal angles derived from a video camera pointed towards the users' eyes then measurements for estimating p( ) should be performed with an ideally identical system (i.e., same camera type, same camera location, same hearing aid types and location, etc.).

It should be noticed that head rotation, as such, is not important to take actively into account. If the head rotates, both target- and eye-angles change, which means that other parts of the table will be populated (as it should).

$f(Y(k,l)|\phi_j(n))$ can generally be computed from the fact that $p(d(k,l,\theta_i)|Y(k,l),\phi_j(n))$ sums to a value of 1, i.e., $$\sum_i p(d(k, l, \theta_i) | Y(k, l), \phi_j(n)) = 1.$$

However, in the specific example of a MAP estimator, this factor may be completely ignored (e.g., set to 1), because the normalization constant is not a function of $d(k,l,\theta_i)$.

In other words, once we have computed the numerator of the right hand side of the above expression for $p(d(k,l,\theta_i)|Y(k,l),\phi_j(n))$ (from the two factors explained above) we don't need to compute the denominator explicitly, because the left-hand side sums to 1 as it is a probability mass function.

Using the Estimated a Posteriori Probability of RATFs in HA Applications:

As mentioned, knowledge about the location, or more specifically the probability mass function $$p(d(k,l,\theta_i)|Y(k,l),\phi_j(n)), i=1, \ldots, I$$

is useful for several purposes. In this section, we outline very briefly such purposes. Specifically, we discuss a) how to use it to estimate the "active" RATF vector (and, hence, the physical location of the target source), and b) how to use it for building beamformers, i.e., spatial filtering algorithms to retrieve the target signal from the (generally noisy) microphone signals.

We keep this description short, because the novel aspect of this invention disclosure is to describe a way to compute $p(d(k,l,\theta_i)|Y(k,l),\phi_j(n))$ i.e., the probability of an RATF vector (or, equivalently a target sound source location) given an auxiliary signal $\phi(n)$ in addition to the traditional microphone signals.

Estimation of RATF Vectors:

The probability mass function $p(d(k,l,\theta_i)|Y(k,l),\phi_j(n))$, i=1, . . . , I describes the probability that the various RATF vectors $d(k,l,\theta_i)$,i=1, . . . , I "were used" to generate the observed acoustic signal, or—equivalently, the probability that the target sound source is in a particular location.

This may be used to compute various estimates of the "active" RATF vector (and, hence, the location of the target source). We present some examples below—for the person skilled in the art it is possible to use $p(d(k,l,\theta_i)|Y(k,l),\phi_j(n))$, i=1, . . . , I to derive others.

Maximum a Posterior (MAP) Estimation of RATF Vectors:

We consider here the so-called maximum a posterior (MAP) estimator of $d(k,l,\theta_i)$. For the MAP estimator, we must select the most probable RATF vector from the dictionary D given $Y(k,l)$ and $\phi_j(n)$. The MAP estimator is found by selecting the RATF vector from the dictionary whose posterior probability is maximal i.e.

$$\hat{d}_{MAP}(k, l) = \arg \max_{d(k,l,\theta_i) \in D} p(d(k, l, \theta_i) | Y(k, l), \phi_j(n)),$$

where $p(d(k,l,\theta_i)|Y(k,l),\phi_j(n))$ is the posterior probability of $d(k,l,\theta_i)$ given observations of $Y(k,l)$ and $\phi_j(n)$. To do so, we compute $p(d(k,l,\theta_i)|Y(k,l),\phi_j(n))$ for each and every dictionary element $d(k,l,\theta_i)$ and select the element for which this posterior probability is largest.

Hence, using the derived expressions above, the MAP estimator is now given as $$\hat{d}_{MAP}(k, l) = \arg \max_{d(k,l,\theta_i) \in D} f(Y(k, l) | d(k, l, \theta_i)) \cdot p(d(k, l, \theta_i) | \phi_j(n)),$$

where—for each candidate RATF vector d $(k,l,\theta_i)$ from the dictionary D—the likelihood function $f(Y(k,l)|d(k,l,\theta_i))$ may be computed using the equations above, and the posterior probability $p(d(k,l,\theta_i|\phi_j(n))$ may be found, for example, from a pre-computed table.

The RATF estimate $\hat{d}_{MAP}(k,l)$ can for example be used in the design of beamforming algorithms (see below) or to infer the physical position of the target sound source with respect to the user.

Minimum Mean-Square Error (MMSE) Estimation of RATF Vectors:

The MAP RATF estimator above chooses the most probable RATF vector $d(k,l,\theta_i)$ from a pre-defined dictionary D, based on observations of $Y(k,l)$ and $\phi_j(n)$. However, since the RATF dictionary D is finite (and possibly small), the RATF vector that is "active" in a practical acoustic situation may not be present in the dictionary. An alternative, which is not confined to output RATF vectors present in the dictionary is the minimum mean-square error (MMSE) estimator. It can be shown (using similar derivations as [1,4]) that the MMSE estimator of the RATF vector is given by $$\hat{d}_{MMSE}(k, l) = \sum_{i=1}^{I} d(k, l, \theta_i) \cdot p(d(k, l, \theta_i) | Y(k, l), \phi_j(n))$$

where $d(k,l,\theta_i)$ are simply the vector elements of the RATF dictionary D and $p(d(k,l,\theta_i)|Y(k,l),\phi_j(n))$ can be computed as shown in Sec. 2.2.

Estimation of Target Signal:

the target signal $\bar{X}(k,l)$ signal impinging on the reference microphone. This is of obvious interest in a hearing aid application, since $\bar{X}(k,l)$ is the noise-free target signal; being able to present this to the hearing aid user rather than the noisy microphone signal $Y(k,l)$ is generally advantageous in terms of speech intelligibility, sound quality and listening effort. In literature, many such methods have been proposed, which rely on $p(d(k,l,\theta_i)|Y(k,l))$, i.e., only acoustic information. It is straightforward to extend these methods to use access to users' eye-gaze information, i.e., rather than using $p(d(k,l,\theta_i)|Y(k,l))$ we now use $p(d(k,l,\theta_i)|Y(k,l),\phi_j(n))$, $i=1, \ldots, I$.

Bayesian Minimum Mean-Square Error (MMSE) Beamforming:

Given $p(d(k,l,\theta_i)|Y(k,l),\phi_j(n))$ $i=1, \ldots, I$, one may apply the so-called Bayesian Beamforming approach for noise reduction [5], to compute $$\hat{\bar{x}}_{MMSE}(k, l) = E[\bar{X}(k, l) | Y(k, l), \phi_j(n)] = \qquad \text{Eq. (2)}$$
$$\sum_{i=1}^{I} \hat{\bar{x}}_{MMSE}(k, l, \theta_i) \cdot p(d(k, l, \theta_i) | Y(k, l), \phi_j(n)),$$

where $\bar{X}_{MMSE}(k,l,\bar{X})$ is the well-known multi-channel Wiener filter, implemented using the RATF vector $d(k,l,\bar{X})$. Implementing the multi-channel Wiener filters $\bar{X}_{MMSE}(k,l,\bar{X})$ is well-known—a detailed description may be found in [4].

Bayesian Minimum Variance Distortion-Less Response (MVDR) Beamforming:

Sometimes the $\bar{X}_{MMSE}(k,l,\theta_i)$ beamformers used above lead to audible distortions. To avoid this, one may use a heuristically motivated Bayesian MVDR beamformer [1, 5], given by $$\bar{X}_{MVDR}(k,l) = E_{i=1}^{I} \bar{X}_{MVDR}(k,l,\theta_i) \cdot p(d(k,l,\theta_i)|Y(k,l),\phi_j(n)) \qquad \text{Eq. (3)}$$

where $\bar{X}_{MVDR}(k,l,\theta_i)$ is the MVDR spatial filter, implemented using the RATF vector $d(k,l,\theta_i)$. As before, practical implementation of MVDR beamformers $\bar{X}_{MVDR}(k,l,\theta_i)$ is a well-studied topic (see e.g., [6]).

Maximum Aposteriori Probability (MAP) beamforming:

The Bayesian beamformers outlined above are linear combinations of beamformers "pointed in a particular direction", where the weight of each such beamformer is the posterior probability $p(d(k,l,\theta_i)|Y(k,l),\phi_j(n))$ $i=1, \ldots, I$. Rather than using such linear combination, one may find maximum aposteriori beamformers simply by using the MAP estimate of the RATF vector given above:

$$\hat{d}_{MAP}(k, l) = \arg \max_{d(k,l,\theta_i) \in D} f(Y(k, l) | (d(k, l, \theta_i)) \cdot p(d(k, l, \theta_i) | \phi_j(n)).$$

In other words, this leads to MAP variants of the beamformers above, $\bar{X}_{MMSE}(k,l,\theta_{i^*})$ and $\bar{X}_{MVDR}(k,l,\theta_{i^*})$, respectively, where the index $i^*$ is the index of the maximum aposteriori RATF:

$$i^* = \arg \max_i f(Y(k, l) | d(k, l, \theta_i)) \cdot p(d(k, l, \theta_i) | \phi_j(n)), i = 1, \ldots, I.$$

Figure 3:
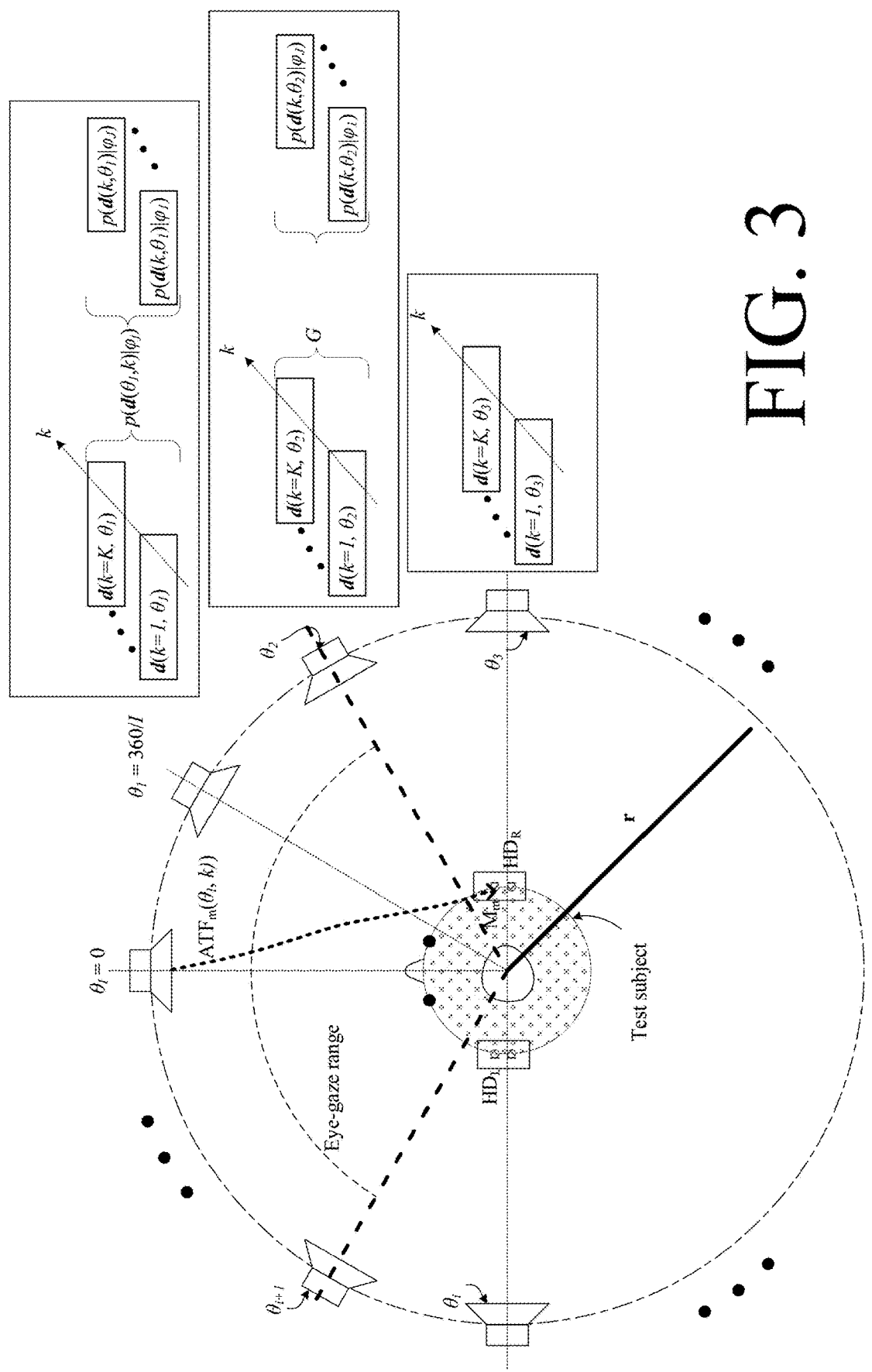

FIG. 3 schematically illustrates an off-line setup, for a given test person, for providing a combination of estimates of absolute and/or relative acoustic transfer functions (ATFm($\theta_j$, k)) for a given microphone of a hearing aid (HD, or a pair of hearing aids (HD$_R$, HD$_L$)) for different target candidate locations ($\theta_i$, i=1, ..., I) as a function of a frequency index (k, k=1, ..., K), and conditional probabilities $p(d(k,\theta_i)|\phi_j(n))$ i=1, ..., I, j=1, ..., J for each acoustic transfer function (ATF$_m$($\theta_i$,k)) given different eye-gaze angles of the user ($\phi_j$, j=1, ..., J). FIG. 3 shows e.g. a setup for estimating, e.g. measuring, e.g. on a real person or on an artificial person (denoted 'Test subject' in FIG. 3, e.g. a physical model, e.g. a HATS model), of relative frequency dependent acoustic transfer functions $d_m(\theta_j, k)$ for locations of a target sound source (cf. different locations of loudspeakers on circle) and different microphones (m= 1, ..., M) of the right (HD$_R$) and left hearing aids (HD$_L$, HD$_R$) of a binaural hearing system.

The geometrical measurement setup for different locations (($\theta_i$, i=1, ..., I) is e.g. as shown in FIG. 1A, 1B. FIG. 1A illustrates locations of the sound source at different, evenly distributed, positions on the perimeter of a circle, cf. crosses 'x'. It is intended that the measurements may be performed individually on microphones of the right hearing aid (HD$_R$) and the left hearing aid (HD$_R$). The results of the measurements may be stored in respective left and right hearing aids (databases $\Theta_L$ and $\Theta_R$) or in a common database $\Theta_C$ stored in one of or in each of the left and right hearing aids, or in another device or system in communication with the left and/or right hearing aids.

An eye-gaze angle range indicated in FIG. 2 (as the range of normal eye gaze of a human being, e.g. the user, is indicated in FIG. 3 (cf. dashed are denoted 'eye-gaze range' limited by bold dashed radial lines from location $\theta_{i+1}$ to $\theta_2$), in the example of FIG. 3 from $\theta_{10}$ to $\theta_2$, e.g. from)–60° (=300° to +60°). The predetermined conditional probabilities may be determined only for the locations within the eye-gaze range (as indicated in FIG. 3), or alternatively for all locations.

The location of the sound source relative to the hearing aid (microphone system or microphone) is symbolically indicated by symbol $\theta_j$ and shown in FIG. 3 as an angle in a horizontal plane, e.g. a horizontal plane through the ears of the person or user (when the person or user is in an upright position). It may however also be indicated by polar coordinates, e.g. ($\theta$, r) horizontal plane (as indicated in FIG. 1B) or out of a horizontal plane (e.g. (x, y, z)). The acoustic transfer functions ATF stored in the database(s) may be or represent absolute acoustic transfer functions AATF or relative acoustic transfer functions RATF.

Figure 4:
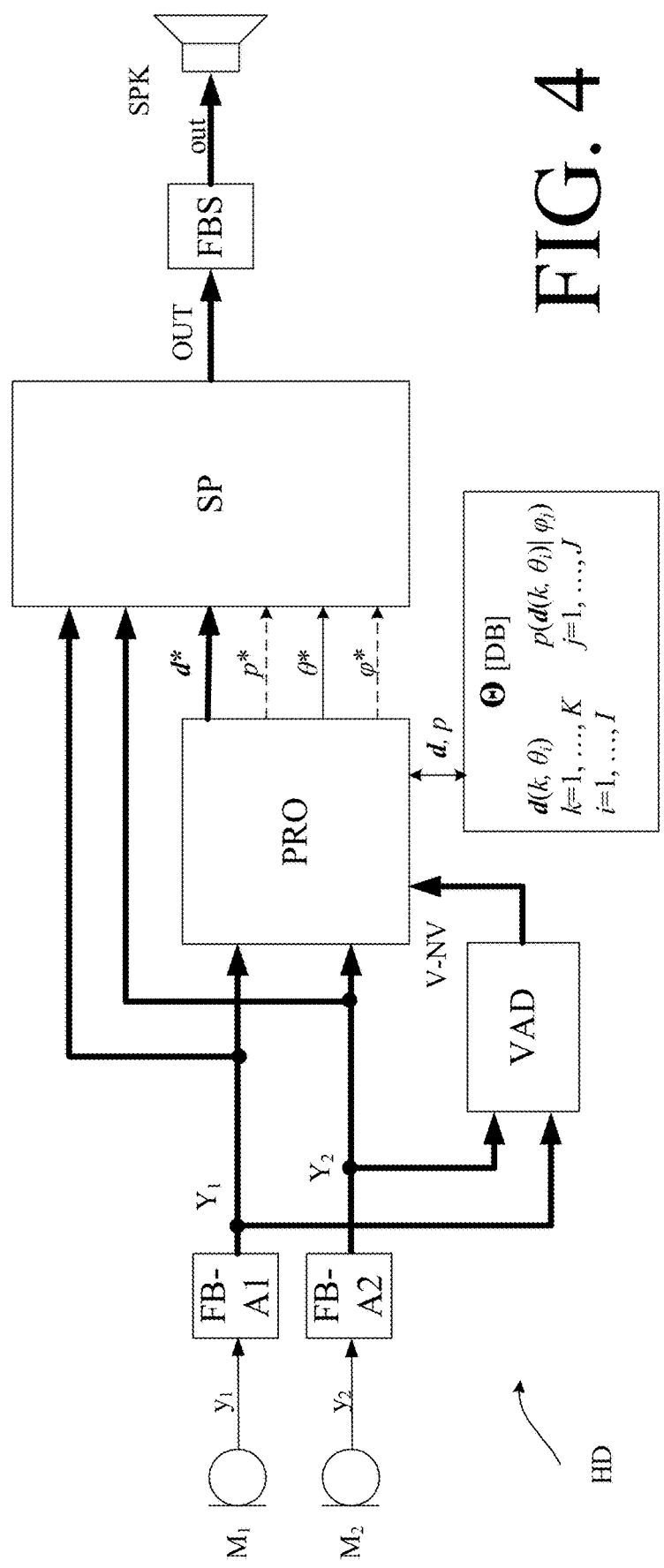

FIG. 4 shows an exemplary block diagram of a hearing aid (HD) according to the present disclosure. The hearing aid (HD) may e.g. be configured to be worn on the head at or in an ear of a user (or be partly implanted in the head at an ear of the user). The hearing aid comprises a microphone system comprising a multitude of M of microphones (here two $M_1$, $M_2$), e.g. arranged in a predefined geometric configuration, in the housing of the hearing aid. The microphone system is adapted to pick up sound from the environment and to provide corresponding electric input signals $y_m(n)$, m=1, 2, where n represents time. The environment sound at a given microphone may comprise a mixture (in various amounts) of a) a target sound signal $x_m(n)$ propagated via an acoustic propagation channel from a direction to or a location ($\theta$) of a target sound source to the $m^{th}$ microphone of the hearing aid when worn by the user, and b) additive noise signals $v_m(n)$ as present at the location of the $m^{th}$ microphone (and possibly later arrived reflections of the target signal (reverberation)). The acoustic propagation channel may be modeled as $y_m(n)=x_m(n)h_m(\theta)+v_m(n)$, wherein $h_m(\theta)$ is an acoustic impulse response for sound for that acoustic propagation channel. The hearing aid comprises a processor (PRO) connected to the microphones ($M_1$, $M_2$) receiving (noisy) electric input signals ($Y_1$, $Y_2$). The electric input signals ($Y_1$, $Y_2$) are here provided in a time frequency representation (k,l) as frequency sub-band signals by respective analysis filter banks (FB-A1, FB-A2). One or more (here both) of the electric input signals ($Y_1$, $Y_2$) are further fed to a voice activity detector (VAD) for estimating a presence or absence of human voice (e.g. speech). The voice activity detector provides a voice activity control signal (V-NV) indicative of whether or not (or with what probability) an input signal comprises a voice signal (at a given point in time). The voice activity control signal (V-NV) is fed to the processor (PRO) for possible use in the estimation of a current acoustic transfer function (ATF). The hearing aid further comprises a database $\Theta$ (MEM [DB]) comprising an ATF-dictionary of relative acoustic transfer function (RATF) vectors, here termed d, whose elements $d_m(k,\theta_i)$, m=1, . . . , M, k=1, . . . , K, are frequency dependent (k) (relative) acoustic transfer functions representing direction- or location-dependent ($\theta$), and frequency dependent (k) propagation of sound from a location ($\theta$) of a target sound source to each of said M (here M=2) microphones, k is the frequency index, k=1, . . . , K, where K is a number of frequency bands. The acoustic transfer functions are determined when the microphone system (e.g. a hearing aid device) is mounted on a head at or in an ear of a natural or artificial person (p). The microphone system is preferably mounted on the person in a configuration identical to, or as close as possible to, the configuration of the hearing aid (e.g. a style identical to the style of the hearing aid worn by the user). The ATF-dictionary comprises ATF-vectors $d(k,\theta_i)$, for a natural or artificial person (p), for a multitude of different locations $\theta_j$, j=1, . . . , J relative to the microphone system. The database $\Theta$ further comprises an eye-gaze-dictionary comprising conditional probabilities $p(d(\theta_i)|\phi_j(n))$ related to the acoustic transfer functions ($d_m(\theta_i,k)$, or $d(k,\theta_i)$ or $d(\theta_i)$) (or at least some of them) of the database, given different eye-gaze angles of the user ($\phi_j$, j=1, . . . , J), cf. e.g. FIG. 2, 3. The processor (PRO) is connected to the database (cf. $\Theta$[DB] in FIG. 4) and configured to estimate ATF-vectors ATF*$_\theta$ for the user based on the database $\Theta$, the current electric input signals $x_m(n)$, m=1, . . . , M, (here m=1, 2), the current information ($\phi(n)$) about the user's eyes, e.g. an eye-gaze signal, such as an eye-gaze direction, and the model of the acoustic propagation channels. ATF-vectors ATF* (cf. d* in FIG. 4) for the user may be determined by a number of different methods available in the art, e.g. maximum likelihood estimate (MLE) methods, cf. e.g. EP3413589A1. Other statistical methods may e.g. include Mean Squared Error (MSE), regression analysis (e.g. Least Squares (LS)), e.g. probabilistic methods (e.g. MLE), e.g. supervised learning (e.g. neural network algorithms). The ATF-vector ATF* (d*) for the user may e.g. be determined by minimizing a cost function. The processor (PRO) may be configured—at a given time with given electric input signals—to determine a personalized ATF-vector ATF* (d*) for the user as an ATF-vector ATF* (ATF*$_m(\theta^*,\phi_j^*, k)$, or $d^*_m(\theta^*,\phi_j^*, k)$, m=1, . . . , M, j=1, . . . , J, k=1, . . . , K), i.e. an acoustic transfer function (relative or absolute) for each microphone, for each frequency (k). The ATF-vectors ATF* (d*) are determined from the combined ATF- and eye-gaze-dictionaries. The chosen ATF-vector (d*) is associated with a specific location $\theta_j=\theta^*$ of the sound source, and a specific eye-gaze angle ($\phi^*$) of the user. The processor (PRO) may be configured to present this information ((d*, $\theta^*$) to other parts of the hearing aid, e.g. as in FIG. 4 (cf. solid arrows from processor (PRO) to signal processor (SP)). The signal processor (SP) is configured to for apply one or more processing algorithms to one or more signals of the forward path, e.g. a beamforming algorithm. In the embodiment of FIG. 4, in addition to the chosen ATF-vector ATF* (d*) for the user and the specific location $\theta_j=\theta^*$ of the sound source, other parameters may be forwarded to the signal processor (SP), e.g. the specific eye-gaze angle ($\phi^*$) and/or the conditional probability $p(d(\theta_i)|\phi_j(n))$ associated with the ATF* (d*) vector. The current information ($\phi(n)$) about the user's eyes, e.g. an eye-gaze signal, is provided by the eye-gaze estimator (E-GE, e.g. based on EEG or EOG signals or a camera or cameras facing the eyes of the user, e.g. mounted on a frame of pair of glasses, cf. e.g. FIG. 9A, 9B, 9C). The hearing aid may e.g. be configured to log (over time) one or more of said personalized parameters (e.g. the eye-gaze angle $\phi^*$). The parameters z* (z=d*, p*, $\theta^*$, $\phi^*$) may e.g. be stored together with a parameter indicating a quality (e.g. a signal to noise ratio (SNR), or an estimated noise level, or a signal level, etc.) of the electric input signals (Y) that were used to determine the parameter value(s) in question.

The hearing aid (HD) of FIG. 4 comprises a forward (audio signal) path configured to process the electric input signals ($y_1$, $y_2$) and to provide an enhanced (processed) output signal for (OUT) being presented to the user. The forward path comprises the input transducers (here microphones ($M_1$, $M_2$)) respective analysis filter banks (FB-A1, FB-A2), a signal processor (SP), a synthesis filter bank (FBS), and an output transducer (here a loudspeaker SPK) operationally connected to each other.

The processor (PRO) and the signal processor (SP) may form part of the same digital signal processor (or be independent units). The analysis filter banks (FB-A1, FB-A2), the processor (PRO), the signal processor (SP), the synthesis filter bank (FBS), and the voice activity detector (VAD) may form part of the same digital signal processor (or be independent units).

The signal processor (SP) is configured to apply one or more processing algorithms to the electric input signals (e.g. beamforming and compressive amplification) and to provide a processed output signal (OUT) for presentation to the user via the output transducer. The synthesis filter bank (FBS), located between the signal processor (SP) and the output transducer (SPK), is configured to convert a number of frequency sub-band signals (OUT) to one time-domain signal (out). The output transducer (here a loudspeaker SPK) is configured to convert a signal representing sound to stimuli perceivable by the user as sound (e.g. in the form of vibrations in air, or vibrations in bone, or as electric stimuli of the cochlear nerve).

The hearing aid may comprise antenna and transceiver circuitry configured to allow an exchange of data with another device, e.g. a smartphone or any other portable or stationary device or system. The database Θ may be located in the hearing aid, or in the other device. Likewise, the processor PRO may be located in the hearing aid or in the other device.

Figure 5:
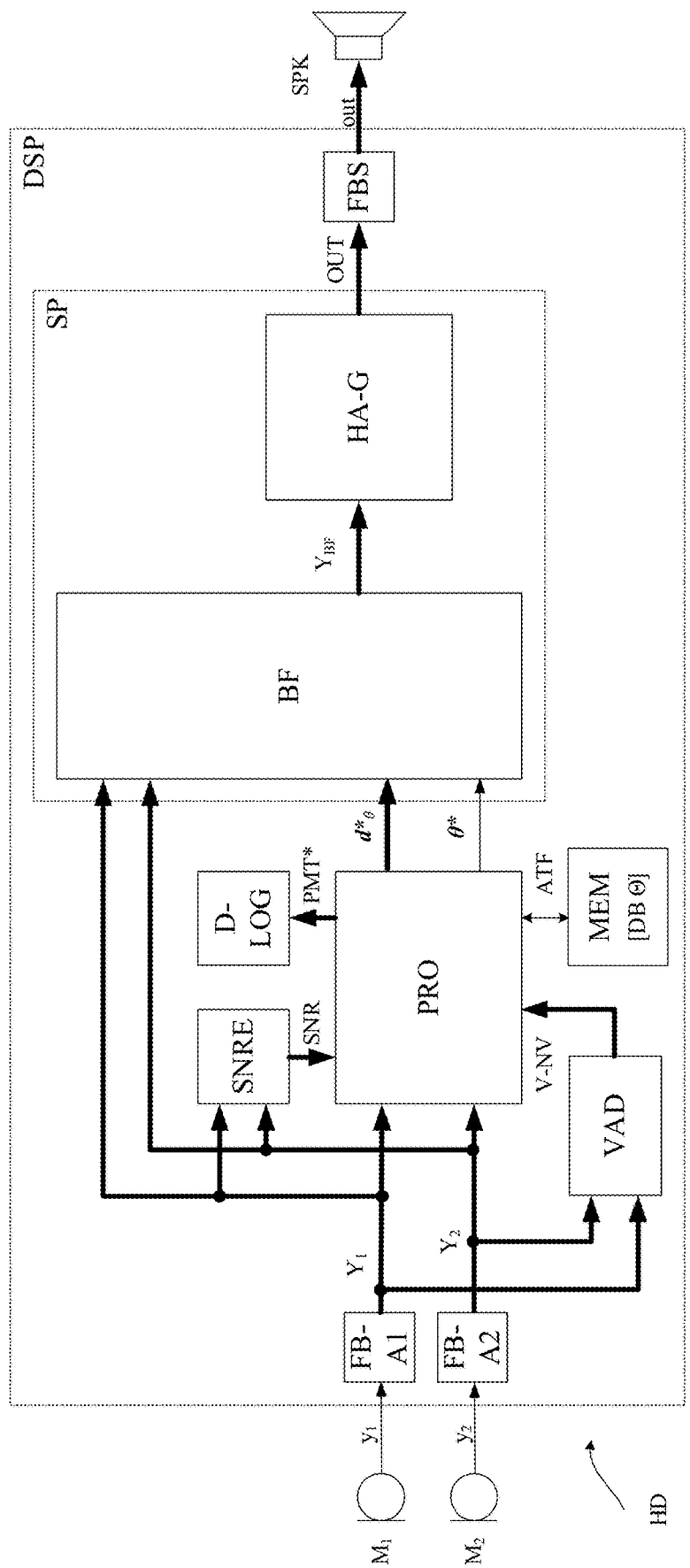

FIG. 5 shows an exemplary block diagram of a hearing aid (HD) according to the present disclosure comprising a beamformer filter. The embodiment of FIG. 5 is similar to the embodiment of FIG. 4 but additionally comprises an SNR-estimator (SNRE), a datalogger (D-LOG), and a beamformer filter BF. The SNR-estimator (SNRE) is configured to estimate a current signal-to-noise-ratio (SNR) (or an equivalent estimate of a quality of the current electric input signals ($y_1$, $y_2$) or of a signal (e.g. a beamformed signal, ($Y_{BF}$)) or signals originating therefrom). The SNR estimate (SNR) is fed to the processor (PRO) (and possibly to other parts of the hearing aid, e.g. to the beamformer and/or to the hearing aid gain controller (HA-G). The datalogger (D-LOG) may store updated parameters PMT* (e.g. a specific location $\theta_j=\theta^*$ of the sound source, and a specific eye-gaze direction φ* associated with a (current) ATF-vector ATF* (e.g. absolute or relative acoustic transfer functions ($H^*_\theta$ or $d^*_\theta$) together with a parameter indicating a quality (e.g. a signal to noise ratio (SNR), and/or an estimated noise level, or a signal level, etc.) of the electric input signals that were used to determine the parameter value(s) in question. The datalogger (D-LOG) receives the specific parameters PMT* from the processor (PRO). The specific parameters PMT* may be qualified using the SNR estimate, so that only parameters determined at an SNR above a threshold value are logged (e.g. stored) in the data logger (D-LOG). The processor (PRO) feeds the specific acoustic transfer function (here the relative acoustic transfer function ($d^*_\theta$) and optionally the current location ($\theta_j=\theta^*$) associated therewith e.g. determined according to the present disclosure) determined for the current acoustic situation (as reflected by the electric input signals ($y_1$, $y_2$), and optionally by the voice activity detector (VAD)) to the signal processor (SP), specifically to the beamformer filter (BF). The beamformer filter (BF) also receives the electric input signals ($Y_1$, $Y_2$) in a time-frequency representation (k,l), where k and l are frequency and time (-frame) indices, respectively. The beamformer filter (BF) provides a beamformed signal $Y_{BF}$ in dependence of the electric input signals ($Y_1(k,l)$, $Y_2(k,l)$) and the personalized relative acoustic transfer function ($d^*_\theta$) as e.g. discussed in [10]. The beamformed signal $Y_{BF}$ is fed to a hearing aid gain controller (HA-G) for applying a frequency dependent gain (e.g. provided by a compression algorithm) to the beamformed signal according to the user's needs, e.g. to compensate for a hearing impairment of the user. The hearing aid gain controller (HA-G) provides a processed signal (OUT) as a frequency sub-band signal that is fed to the synthesis filter bank (FBS) for conversion to the time-domain signal out (as in FIG. 4). The beamformer filter and the hearing aid gain controller (HA-G) form part of the signal processor (SP), as indicated by dotted rectangle denoted SP in FIG. 5. All fully digital functional components of FIG. 5 (FB-A1, FB-A2, VAD, PRO, SNRE, D-LOG, BF, HA-G, FBS and optionally memory (MEM)) may form part of a customized or standard digital signal processor (adapted for audio processing). The memory (MEM) may e.g. be implemented as a separate chip.

Figure 6:
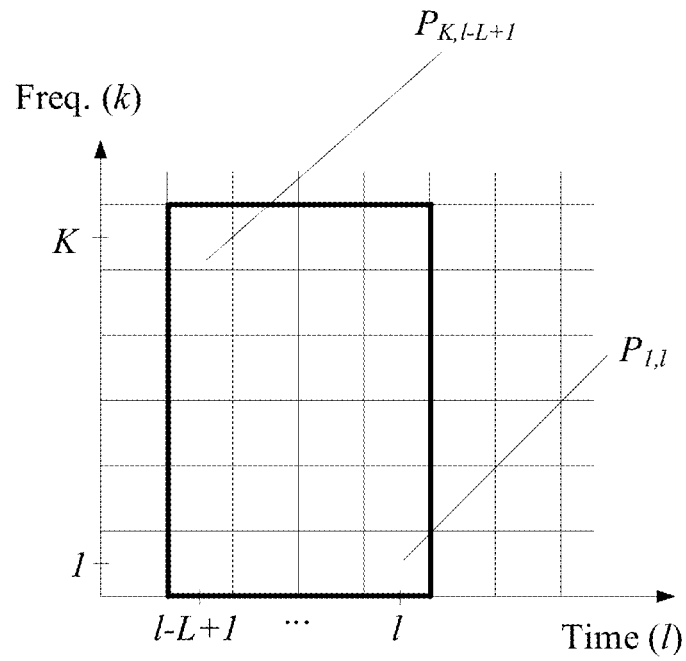

FIG. 6 schematically shows the 'history' used in the integration over time of the conditional probabilities p(d(k, l,$\theta_i$(k,l)|Y(k,l),$\phi_j$(n)) of a given acoustic transfer function d(k,l,$\theta_i$) being the optimal one at a given time 1, given current microphone signals Y(k,l) and eye gaze angles φ(n) for time instants l' included in the history defined by the parameter L.

Integration over time may e.g. be appropriate in a situation where two or more speakers are active in a discussion to thereby allow for 1) switching a beamformer between the two or more speakers or 2) to allow for generating two or more 'fixed' beamformers directed towards the two or more speakers. In the first case, the plurality of time units may correspond to L being of the order of milli-seconds (ms), e.g. in a range between 10 and 50 ms, e.g. 20 ms. In the second case, the plurality of time units may correspond to L being of the order of seconds (s), e.g. in a range between 5 s and 10 s.

Integration over time of the conditional probability p(d (k,l,$\theta_i$)|Y(k,l),$\phi_j$(n)) may e.g. be expressed as $$\hat{P}(k, l) = \frac{1}{L} \sum_{l'=l-L+1}^{l} p(d(k, l', \theta_i) | Y(k, l'), \phi_j(l'))$$

where l represents the current time and L represents the averaging time,

Including integration over frequency leads to the following expression:

$$\hat{P}(l) = \frac{1}{K}\frac{1}{L}\sum_{k=1}^{K} \sum_{l'=l-L+1}^{l} p(d(k, l', \theta_i) | Y(k, l'), \phi_j(l'))$$

The parameter L, which defines the time duration upon which averaged probability is based, is chosen according to the application. Typical values of L correspond to time durations of 20 ms, 100 ms, 200 ms, 500 ms, 1 s, 5 s, 10 s, or more. In some applications, L could correspond to the duration of a sentence or a number of sentences.

The averaging procedure, where frequency dependent weights w k are pre-determined weight factors, e.g. to indicate proportionate importance of different frequency bands, i.e., $0 \leq w_k \leq 1$ and $\Sigma_k w_k = 1$.

Figure 7:
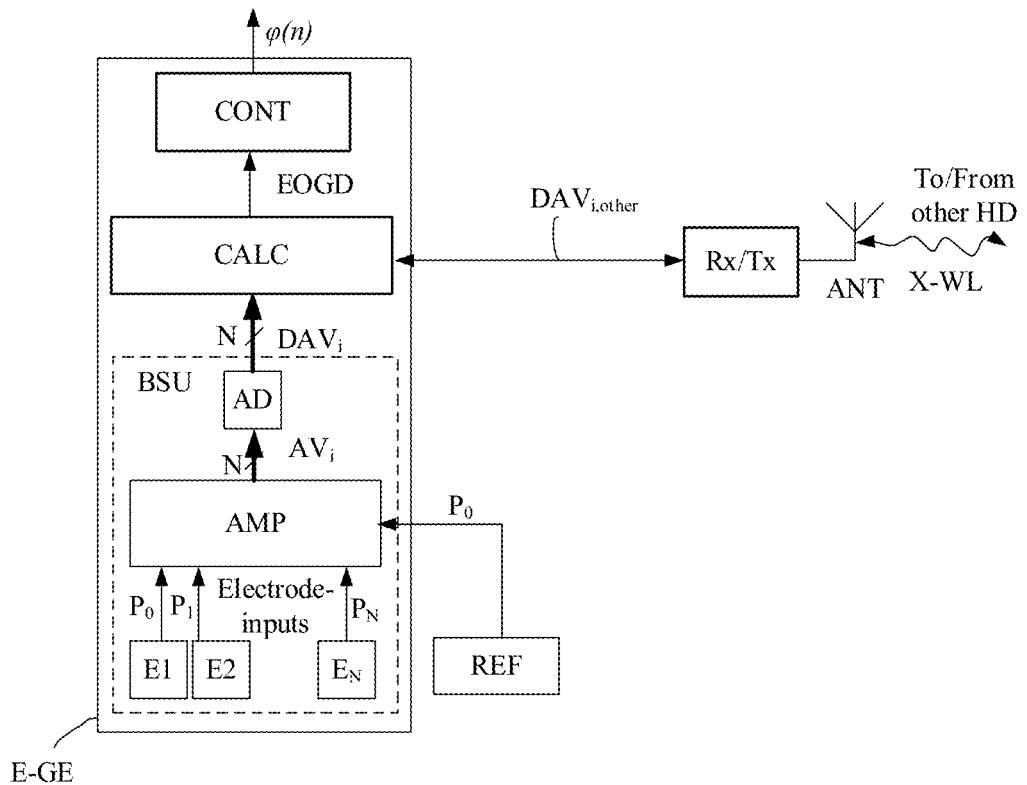

FIG. 7 shows an exemplary eye-gaze estimator for implementation in a hearing aid according to the present disclosure.

The hearing aid (HD) of FIG. 4 comprises an eye-gaze estimator (E-GE) for estimating a current eye-gaze direction (φ(n)) of the user. The eye-gaze estimator (E-GE) comprises a bio-signal-sensing unit (BSU) for capturing a bio signal (e.g. an EEG or EOG-signal) from the user's body. The bio-signal-sensing unit (BSU) comprises a sensor part ($E_1$, $E_2$, ..., $E_N$) adapted for being located at or in an ear and/or for fully or partially for being implanted in the head of a user. The sensor part comprises an electrical potential sensor for sensing an electrical potential from the body of the user, in particular from the head, e.g. due to brain activity or eye movement. The sensor part is embodied as electrodes $E_1$, $E_2$, ..., $E_N$, which are electrodes of the hearing aid configured to contact skin or tissue of the user's head, when the hearing device is operationally mounted on the user (e.g. in an ear canal) or implanted in the head of the user. The bio-signal-sensing unit (BSU) further comprises an amplifier (AMP), in the form of electronic circuitry coupled to the electrical potential sensor part to provide an amplified output. The amplifier, e.g. a differential amplifier, receives a number of potentials $P_1$, $P_2$, ..., $P_N$ from the electrodes $E_1$, $E_2$, ..., $E_N$, and a reference potential $P_0$ from a reference electrode (REF), and provides respective amplified voltages $AV_1$, $AV_2$, ..., $AV_N$. The amplified voltages are fed to respective analogue to digital converters (AD) providing digitized amplified voltages $DAV_i$ (i=1, 0.2, ..., N). In an embodiment, the amplifier (AMP) includes analogue to digital conversion or is constituted by analogue to digital converters.

The hearing device further comprises a wireless transceiver and appropriate antenna circuitry (Rx/Tx, ANT) allowing reception of bio signals BioV from and transmission of bio signals BioV to a contra lateral hearing device, e.g. amplified voltages $V_1$, $V_2$, ..., $V_N$, e.g. eye movement, via a wireless link (X-WL), cf. waved, arrowed line denoted 'To/From other HD' in FIG. 7. The bio signals $DAV_{i,contra}$ from a contra-lateral hearing device are fed to calculation unit (CALC) and compared to the corresponding locally generated bio signal(s) $DAV_i$, e.g. amplified voltages $V_1$, $V_2$, ..., $V_N$) or rather voltage differences $V_1$-$V_0$, ... $V_N$-$V_0$, where $V_0$ is a reference potential provided by reference electrode (REF). In an embodiment, the EarEOG signal is a function (f) of a difference between the left and right, amplified voltages $V_{left}$ and $V_{right}$, EarEOG=f($V_{left}$-$V_{right}$). In an embodiment, each pair of voltages, $V_{1,left}$ and $V_{1,right}$, ..., $V_{N,left}$ and $V_{N,right}$, may provide corresponding ear EOG signals, e.g. EarEOG$_1$=f($V_{1,left}$-$V_{1,right}$), EarEOG$_N$=f($V_{N,left}$-$V_{N,right}$). In an embodiment, a resulting ear EOG signal at a given time may be found as an average (e.g. a weighted average; e.g. in dependence of the distance of the electrodes in question from the eyes) of the N ear EOG signals. This averaging and other processing may be performed in the calculation unit (CALC).

The eye-gaze estimator (E-GE) further comprises the calculation unit (CALC) and a control unit CONT. The calculation unit (CALC) configured to combine the digitized amplified voltages $DAV_i$ (i=1, 0.2, ..., N), representative of (ear) EEG and/or (ear) EOG signals, from the (local) bio signal unit (BSU) and the corresponding digitized amplified voltages $DAV_{i,contra}$ (i=1, 0.2, ..., N), received from a bio signal unit (BSU) of a contra-lateral hearing device (cf. e.g. wireless link X-WL in FIG. 7), to provide combined eye-gaze signal data. The calculation unit (CALC) may further comprise a Kalman filter (FIL) (or one or more Kalman filters) for filtering the individual or combined digitized amplified voltages providing eye gaze angles, cf. signal EOGD. The signal EOGD is forwarded to control unit CONT. The control unit (CONT) provides control signal co(n) representative of a current eye-gaze direction of the user. As illustrated in FIG. 4 the control signal co(n) is provided to a processing unit (PRO) of the hearing aid.

Figure 8B:
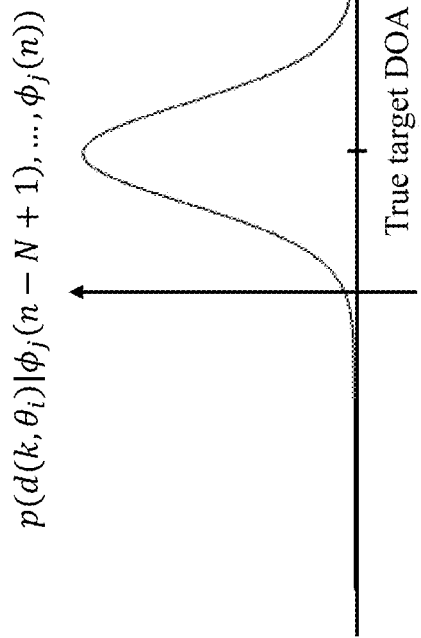
FIG. 8B schematically illustrates how the posterior probability may look like for L observations of the eye-gaze signals (target located to the right side of the user)
Figure 8D:
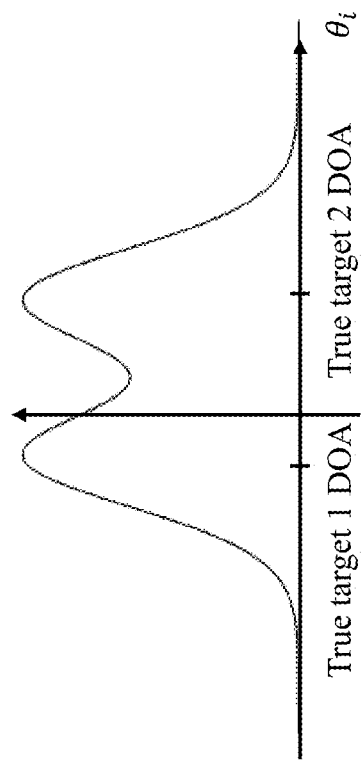
FIG. 8D schematically illustrates how the posterior probability may look like for L observations of the eye-gaze signals for two targets (targets located to the left and right side of the user, respectively)
Figure 8A:
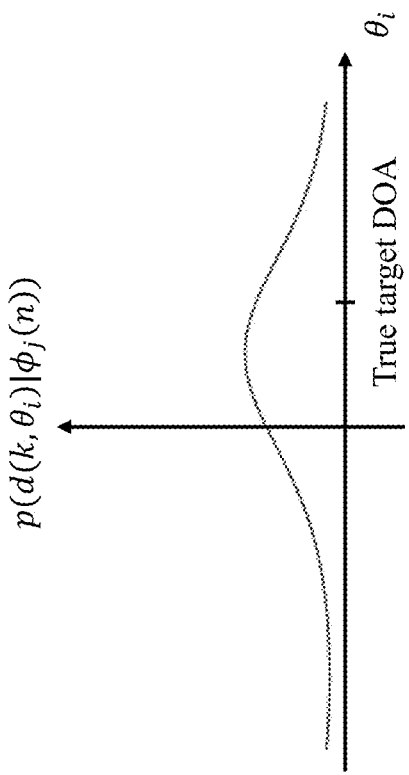
FIG. 8C schematically illustrates how the posterior probability may look like for L observations of the eye-gaze signals (target located to the left side of the user)
Figure 8C:
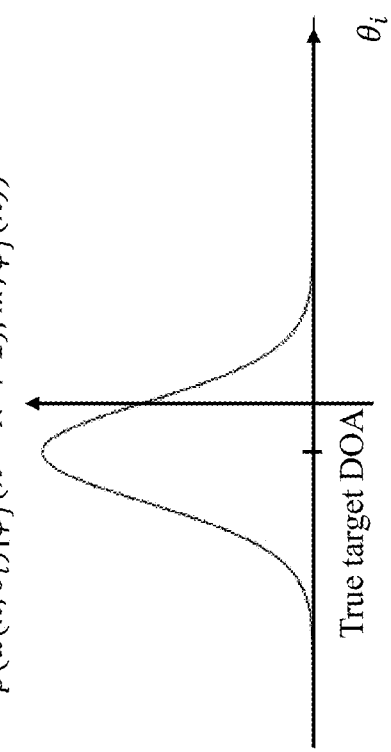

FIG. 8A schematically illustrates how the posterior probability may look like for a single observation of the eye-gaze signal (target located to the right side of the user);

FIG. 8B schematically illustrates how the posterior probability may look like for L observations of the eye-gaze signals (target located to the right side of the user);

FIG. 8C schematically illustrates how the posterior probability may look like for L observations of the eye-gaze signals (target located to the left side of the user); and FIG. 8D schematically illustrates how the posterior probability may look like for L observations of the eye-gaze signals for two targets (targets located to the left and right side of the user, respectively).

FIG. 8A shows an example of the conditional probability distribution $p(d(k,\theta_i)|\phi_j(n))$ as a function of direction ($\theta_i$) given an observation of the eye-gaze signal ($\phi_j(n)$) at time instance n. In this example, the target speaker is located to the right side of the user.

FIG. 8B shows an example of the eye-gaze-only conditional probability distribution $P(d(k,\theta_i)|\phi_j(n-N+1), ..., \phi_j(n))$ as a function of direction ($\theta_i$) given N observations of the eye-gaze signal. An example of computing $p(d(k,\theta_i)|\phi_j(n-N+1), ..., \phi_j(n))$ is by summing the probability distribution $p(d(k,\theta_i)|\phi_j(m))$, m=n-N+1, ..., n, for each N observations of the eye-gaze. The target speaker is located to the right side of the user in this example.

FIG. 8C shows an example of the eye-gaze-only conditional probability distribution $P(d(k,\theta_i)|\phi_j(n-N+1), ..., \phi_j(n))$ as a function of direction ($\theta_i$) given N observations of the eye-gaze signal. The target is located to the left side of the user in this example.

FIG. 8D shows an example of the eye-gaze-only conditional probability distribution $P(d(k,\theta_i)|\phi_j(n-N+1), ..., \phi_j(n))$ as a function of direction ($\theta_i$) given N observations of the eye-gaze signal. In situations with multiple target talkers, the conditional probability distribution $p(d(k,\theta_i)|\phi_j(n-N+1), ..., \phi_j(n))$ may have several statistical modes, where each mode indicates the most likely location of each target speaker. In this example there are two target speakers present, one to the left and one to the right side of the user.

Additional comment of how to use the eye-gaze-only conditional probability distribution: The eye-gaze-only conditional probability distribution $p(d(k,\theta_i)|\phi_j(n-NC+1), ..., \phi_j(n))$ can for example be used to compute the audio-eye-gaze conditional probability distribution $p(d(k,\theta_i)|Y(k,l),\phi_j(n-NC+1), ..., \phi_j(n))$ as in Eq. (1) and then, for example, be used in a Bayesian beamforming (see e.g. Eq. (2) and (3) above).

The time index n used on the time varying function φ(n) of the conditional probabilities p in FIG. 8A, 8B, 8C, 8D may preferably be synchronized with the tile index l used elsewhere in the application (e.g. in $p(d(k,l,\theta_i)|\phi_j(n))$. The value N of the index n indicates a duration of the history considered in the graphs FIG. 8B, 8C, 8D. The value of N may e.g be of the order of 10 seconds, cf. also description of FIG. 6 and proposed values of the corresponding parameter L.

Figure 9A:
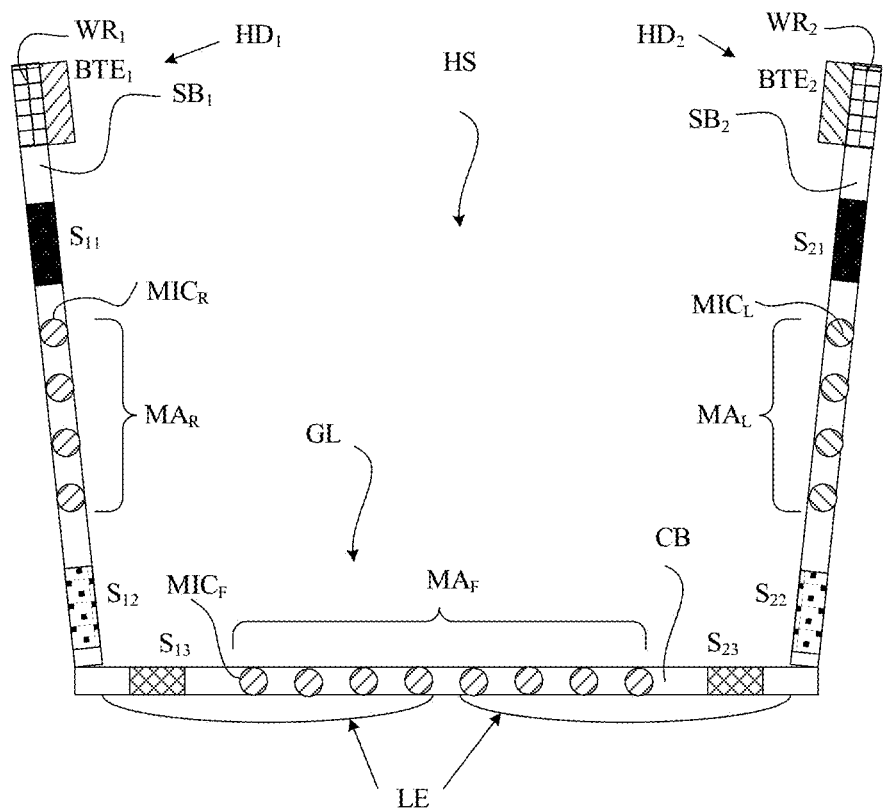
FIG. 9A shows a top view of a second embodiment of a hearing system comprising first and second hearing devices integrated with a spectacle frame.
Figure 9B:
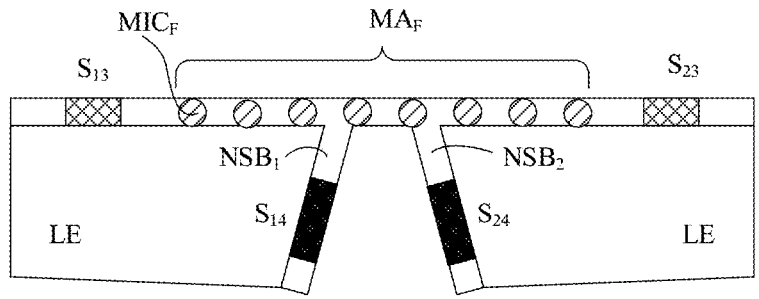
FIG. 9B shows a front view of the embodiment in FIG. 9A.

FIG. 9A shows a top view of a first embodiment of a hearing system comprising first and second hearing devices integrated with a spectacle frame. FIG. 9B shows a front view of the embodiment in FIG. 9A, and FIG. 9C shows a side view of the embodiment in FIG. 9A.

The hearing system according to the present disclosure comprises a sensor integration device configured to be worn on the head of a user comprising a head worn carrier, here embodied in a spectacle frame.

The hearing system comprises left and right hearing devices and a number of sensors mounted on the spectacle frame. The hearing system (HS) comprises a number of sensors $S_{1i}$, $S_{2i}$, (i=1, ..., $N_S$) associated with (e.g. forming part of or connected to) left and right hearing devices ($HD_1$, $HD_2$), respectively. $N_S$ is the number of sensors located on each side of the frame (in the example of FIG. 9A, 9B, 9C assumed to be symmetric, which need not necessary be so, though). The first, second, third, and fourth sensors $S_{11}$, $S_{12}$, $S_{13}$, $S_{14}$ and $S_{21}$, $S_{22}$, $S_{23}$, $S_{24}$ are mounted on a spectacle frame of the glasses (GL). In the embodiment of FIG. 9A, sensors $S_{11}$, $S_{12}$ and $S_{21}$, $S_{22}$ are mounted on the respective sidebars ($SB_1$ and $SB_2$), whereas sensors $S_{13}$ and $S_{23}$ are mounted on the cross bar (CB) having hinged connections to the right and left side bars ($SB_1$ and $SB_2$). Finally, sensors $S_{14}$ and $S_{24}$ are mounted on first and second nose sub-bars ($NSB_1$, $NSB_2$) extending from the cross bar (CB) and adapted for resting on the nose of the user. Glasses or lenses (LE) of the spectacles are mounted on the cross bar (CB) and nose sub-bars ($NSB_1$, $NSB_2$). The left and right hearing devices ($HD_1$, $HD_2$) comprises respective BTE-parts ($BTE_1$, $BTE_2$), and further comprise respective ITE-parts ($ITE_1$, $ITE_2$). It should be noted though that replacement of an ITE part would change the transfer function between all microphones of the glasses and the replaced ITE part. In an embodiment, all microphones the system are located on the glasses and/or on the BTE part. The ITE-parts may e.g. comprise electrodes for picking up body signals from the user, e.g. forming part of sensors $S_{1i}$, $S_{2i}$ (i=1, ..., $N_S$) for monitoring physiological functions of the user, e.g. brain activity or eye movement activity or temperature. Likewise, the one or more of the sensors on the spectacle frame may comprise electrodes for picking up body signals from the user. In an embodiment, sensors S11, S14 and S21, S24 (black rectangles) may represent sensor electrodes for picking up body signals e.g. Electrooculography (EOG) potentials and/or brainwave potentials, e.g. Electroencephalography (EEG) potentials, cf. e.g. [7]. The sensors S14, S24 on the first and second nose sub-bars ($NSB_1$, $NSB_2$) may be particularly well positioned to capture changes in potentials of the eyes and hence to provide a current eye gaze angle of the user (cf. signal co(n), referred to above). The sensors mounted on the spectacle frame may e.g. comprise one or more of an accelerometer, a gyroscope, a magnetometer, a radar sensor, an eye camera (e.g. for monitoring pupillometry), a camera (e.g. for imaging objects of the environment of the user), or other sensors for localizing or contributing to localization of a sound source (or other landmark) of interest to the user wearing the hearing system and/or for identifying a user's own voice. The sensors ($S_{13}$, $S_{23}$) located on the cross bar (CB) and/or sensors (e.g. $S_{12}$, $S_{22}$) located on the side bars ($SB_1$, $SB_2$) may e.g. include one or more cameras or radar or ultra sound sensors for monitoring the environment and/or for identifying a user's own voice. The hearing system further comprises a multitude of microphones, here configured in three separate microphone arrays ($MA_R$, $MA_L$, $MA_F$) located on the right, left side bars and on the (front) cross bar, respectively. Each microphone array ($MA_R$, $MA_L$, $MA_F$) comprises a multitude of microphones ($MIC_R$, $MIC_L$, $MIC_F$, respectively), here four, four and eight, respectively. The microphones may form part of the hearing system (e.g. associated with the right and left hearing devices ($HD_1$, $HD_2$), respectively), and contribute to localise and spatially filter sound from the respective sound sources of the environment around the user, cf. e.g. [8]. The use of a spectacle frame as a carrier for a number of sensors in cooperation with respective left and right BTE-parts of a hearing system is e.g. illustrated and discussed in FIG. 1A, 1B of [9].

Figure 9C:
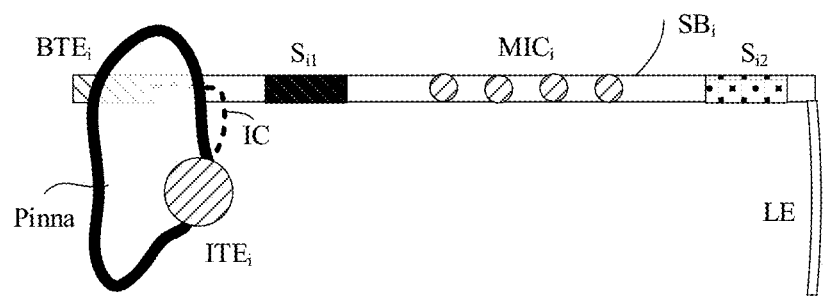
FIG. 9C shows a side view of the embodiment in FIG. 9A.

The BTE- and ITE parts (BTE and ITE) of the hearing devices are electrically connected, either wirelessly or wired, as indicated by the dashed connection between them in FIG. 9C. The ITE part may comprise a microphone (cf. MITE in FIGS. 4A, 4B) and/or a loudspeaker (cf. SPK in FIG. 4A, 4B, 4C) located in the ear canal during use. One or more of the microphones ($MIC_L$, $MIC_R$, $MIC_F$) on the spectacle frame may take the place of the microphone(s) that would normally be located in an ITE-part and/or a BTE-part of the hearing aid. Alternatively, or additionally, the BTE-part(s) of the embodiment of FIGS. 9A, 9B and 9C may comprise further microphones ($MBTE_p$, $MITE_q$).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

It should be emphasized that the framework of the present disclosure works no matter how the eye data is obtained (camera, electrodes, etc.), and no matter whether data is corrupted by measurement noise (although, of course, performance of the system will be better, the cleaner eye data are).

SNR-dependent prior $p(d_i, \varphi_j)$ (from which conditional probabilities $p(d_i|\varphi_j)$) can be estimated—take into account that at low SNRs, eyes tend to be at target more often than at high SNRs.

REFERENCES

[1] P. Hoang, Z.-H. Tan, J. M. de Haan, T. Lunner, and J. Jensen, "Robust Bayesian and Maximum a Posteriori Beamforming for Hearing Assistive Devices," in 2019 *IEEE Global Conference on Signal and Information Processing (GlobalSIP)*, Ottawa, ON, Canada, November 2019, pp. 1-5.

[2] J. Jensen, J. M. De Haan, and M. S. Pedersen, "A microphone system and a hearing device comprising a microphone system," EP3413589A1, Dec. 12, 2018

[3] J. Jensen and U. Kjems, "Maximum Likelihood Based Noise Covariance Matrix Estimation For Multi-Microphone Speech Enhancement," EUSIPCO, August 2012.

[4] J. Jensen and M. S. Pedersen, "Analysis of beamformer directed single-channel noise reduction system for hearing aid applications," in 2015 *IEEE International Conference on Acoustics, Speech and Signal Processing (ICASSP)*, South Brisbane, Queensland, Australia, April 2015, pp. 5728-5732.

[5] K. L. Bell, Y. Ephraim, and H. L. Van Trees, "A Bayesian approach to robust adaptive beamforming," *IEEE Transactions on Signal Processing*, vol. 48, no. 2, pp. 386-398, February 2000.

[6] E. Habets, J. Benesty, I. Cohen, S. Gannot, and J. Dmochowski, "New Insights Into the MVDR Beamformer in Room Acoustics," *IEEE Transactions on Audio, Speech, and Language Processing*, vol. 18, no. 1, pp. 158-170, January 2010, doi: 10.1109/TASL.2009.2024731.

[7] T. Lunner, F. Gustafsson, "Hearing device comprising a sensor for picking up electromagnetic signals from the body", EP3185590A1 (Oticon) 28 Jun. 2017.

[8] T. Lunner, F. Gustafsson, D. Lindgren, G. Hendeby, "Direction of arrival estimation in miniature devices using a sound sensor array", EP3267697A1 (Oticon) 10 Jan. 2018

[9] T. Lunner, M. Skoglund, F. Gustafsson, "Hearing system adapted for navigation and method therefor", EP3496417A2 (Oticon) 12 Dec. 2019.

[10] M. S. Pedersen, J. M. de Haan, J. Jensen, "A hearing aid comprising a beam former filtering unit comprising a smoothing unit", EP3253075A1 (Oticon) 6 Dec. 2017

The invention claimed is:

1. A hearing aid configured to be worn at or in an ear of a user, the hearing aid comprising
  a microphone system comprising a multitude of M of microphones, where M is larger than or equal to two, the microphone system being adapted for picking up sound from the environment and to provide M corresponding electric input signals $y_m(n)$, m=1, . . . , M, n representing time, the sound from the environment at a given microphone comprising a mixture of:
    a target sound signal $x_m(n)$ propagated via an acoustic propagation channel from a location of a target sound source to the $m^{th}$ microphone of the hearing aid, when worn by the user, and
    possible additive or non-additive noise signals $v_m(n)$ as present at the location of the $m^{th}$ microphone,
    wherein the acoustic propagation channel is modeled as $y_m(n) = x_m(n) \cdot h_m(n) + v_m(n)$, where $h_m(n)$ is the impulse response from the target sound source to the $m^{th}$ microphone, and wherein the M cooresponding electric input signals are time varying electric input signals;
  a processor connected to said multitude M of microphones and configured to process said electric input signals, or one or more signals originating therefrom; and
  a database comprising:
    a plurality of acoustic transfer function vectors, representing different candidate locations of the target sound source relative to the microphone system, when said microphone system is mounted at or in an ear of a natural or artificial person, wherein the M vector elements of a given acoustic transfer function vector represents frequency dependent acoustic propagation of sound from a location of the target sound source to said M microphones, and
    a multitude of posterior probabilities related to at least some of said acoustic transfer function vectors and different eye-gaze directions of the user, wherein the posterior probability of a specific transfer function vector is the probability of said specific transfer function vector given a particular eye-gaze direction;
  wherein said processor is configured to determine the current location of the target sound source relative to the user in dependence of:
    current values of said time varying electric input signals,
    a time-varying signal, which provides information about a current eye-gaze direction of the user,
    said acoustic transfer function vectors and said posterior probabilities of said database.

2. A hearing aid according to claim 1 wherein the vector elements of the acoustic transfer function vectors are relative acoustic transfer functions.

3. A hearing aid according to claim 1 wherein the acoustic transfer function vectors stored in the database are time-invariant.

4. A hearing aid according to claim 1 wherein the current gaze direction is quantized into a limited number of directions.

5. A hearing aid according to claim 1 wherein said information about a current eye-gaze direction of the user is provided by one or more sensors.

6. A hearing aid according to claim 1 comprising a filter bank allowing said processor to process said electric input signals, or one or more signals originating therefrom, in a time-frequency representation (k,l), where k is a frequency index, and l is a time index.

7. A hearing aid according to claim 1 wherein said current different eye-gaze directions are included in said database as dictionaries of posterior probabilities for different eye gaze directions for at least some of said plurality of acoustic transfer function vectors.

8. A hearing aid according to claim 1 wherein values of posterior probabilities are computed in advance of use of the hearing aid and stored in said database.

9. A hearing aid according to claim 1 wherein said processor is configured to determine said posterior probabilities in dependence of a likelihood of said current electric input signals for given acoustic transfer function vectors.

10. A hearing aid according to claim 1 wherein said processor is configured to determine the current acoustic transfer function vector based on a statistical model linking current observations of the electric input signals and the time-varying signal to the current acoustic transfer function vector as the acoustic transfer function vector exhibiting the maximum of conditional probability given the current electric input signals and the current time-varying signal.

11. A hearing aid according to claim 10 wherein said processor is configured to determine a current target signal in dependence of the conditional probability density function for the acoustic transfer function vector given the current electric input signals and the current time variant signal associated with a current eye-gaze of the user.

12. A hearing aid according to claim 10 wherein said processor is configured to determine weights of a beamformer filter in dependence of said current acoustic transfer function vector.

13. A hearing aid according to claim 10 wherein said processor is configured to estimate a physical location for a given frequency k of the target sound source by identifying the most likely index of the chosen acoustic transfer function.

14. A hearing aid according to claim 10 wherein said processor is configured to estimate a physical location (θ*) of target by finding the index (i*), which maximizes $$i^* = \arg \min_i Z(p(d(k = 1, l, \theta_i) | Y(k = 1, l), \phi_j(n)), \ldots, \cdot p(d(k = K, l, \theta_i) | Y(k = K, l), \phi_j(n))),$$

where $Z(\cdot)$ is a function which combines the probabilities across frequency, e.g. a product of all per-frequency-probabilities, k is a frequency index, k=1. . . . K. K being a number of frequency bands, and i is a location index, i=1. . . . l, l being the number of different locations.

15. A hearing aid according to claim 10 wherein the conditional probability density function providing the probability of the relative transfer function being the currently used relative transfer function, given the current electric input signals, and the time varying signal representing current eye-gaze of the user, is integrated over a plurality of time units.

16. A hearing aid according to claim 1 wherein the processor is configured to enhance the electric input signals and providing a processed electric output signal.

17. A hearing aid according to claim 16 comprising an output unit for providing a stimulus perceived by the user as an acoustic signal based on the processed electric output signal.

18. A hearing aid according to claim 1 being constituted by or comprising an air-conduction type hearing aid, a bone-conduction type hearing aid, a cochlear implant type hearing aid, or a combination thereof.

19. A hearing aid comprising
a microphone system comprising a multitude of M of microphones, where M is larger than or equal to two, the microphone system being adapted for picking up sound from the environment and to provide M corresponding electric input signals $y_m(n)$, m=1, . . . , M, n representing time, the sound from the environment at a given microphone comprising a target sound signal $x_m(n)$ propagated from a location of a target sound source to the $m^{th}$ microphone of the hearing aid, when worn by the user,
a processor connected to said multitude M of microphones and configured to process said electric input signals, or one or more signals originating therefrom;
a database comprising:
a plurality of acoustic transfer function vectors, representing different locations of the target sound source relative to the microphone system, when said microphone system is mounted on a head at or in an ear of a natural or artificial person,
a multitude of conditional probabilities related to at least some of said acoustic transfer function vectors and different eye-gaze directions of the user, wherein the posterior probability of a specific transfer function vector is the probability of said specific transfer function vector given a particular eye-gaze direction;
wherein the processor is configured to determine the conditional probability of a particular acoustic transfer function vector, given the observations of the current electric input signals and a current value of the eye-gaze direction of the user.

20. A hearing aid comprising A) a multitude of microphones for picking up sound in an environment of the user, B) a database comprising b1) a plurality of acoustic transfer function vectors representing different candidate locations of a target sound source in the environment relative to the microphone system, and b2) a multitude of posterior probabilities related to at least some of the acoustic transfer function vectors, each posterior probability representing the probability of a given acoustic transfer function given a particular eye-gaze direction of the user, and C) a processor configured to determine a current location of the target sound source relative to the user in dependence of 1) current values of time varying electric input signals picked up by the multitude of microphones, 2) a time-varying signal providing information about a current eye-gaze direction of the user, and 3) the database.

\* \* \* \* \*